(12) United States Patent
Han et al.

(10) Patent No.: US 11,824,367 B2
(45) Date of Patent: Nov. 21, 2023

(54) WIRELESS CHARGING RECEIVING CIRCUIT AND WIRELESS CHARGING RECEIVER

(71) Applicant: Halo Microelectronics Co., Ltd., Foshan (CN)

(72) Inventors: Shuang Han, Foshan (CN); Rui Liu, Fremont, CA (US); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 0 days.

(21) Appl. No.: 17/665,959

(22) Filed: Feb. 7, 2022

(65) Prior Publication Data

US 2022/0311276 A1    Sep. 29, 2022

(30) Foreign Application Priority Data

Mar. 29, 2021   (CN) .......................... 202110331887.2

(51) Int. Cl.
  *H02J 50/10*  (2016.01)
  *H02M 3/07*  (2006.01)
  *H02M 7/537*  (2006.01)

(52) U.S. Cl.
  CPC ............... *H02J 50/10* (2016.02); *H02M 3/07* (2013.01); *H02M 7/537* (2013.01)

(58) Field of Classification Search
  CPC ........ H02J 2207/20; H02J 7/007; H02J 50/10; H02J 50/12; H02J 7/02; H02J 50/00; H02M 7/103; H02M 7/217; H02M 7/537; H02M 3/07; H02M 1/0067; H02M 1/007; H02M 1/0074; H02M 1/0077; H02M 1/008; H02M 1/0083; H02M 1/0085; H02M 1/0087; H02M 1/009; H02M 1/0093; H02M 3/02; H02M 3/04; H02M 3/06; H02M 3/071; H02M 3/072; H02M 3/073; H02M 3/075; H02M 3/076; H02M 3/077; H02M 3/078;
(Continued)

(56) References Cited

U.S. PATENT DOCUMENTS

2015/0333534 A1   11/2015   Liu et al.
2018/0069433 A1   3/2018   Lin et al.
(Continued)

FOREIGN PATENT DOCUMENTS

CN       104718682       6/2015
CN       104901433 A    9/2015
(Continued)

*Primary Examiner* — Diana J. Cheng
(74) *Attorney, Agent, or Firm* — AP3 Law Firm PLLC

(57) ABSTRACT

A wireless charging receiving circuit includes a coil, a first energy storage unit, a second energy storage unit, a first switch unit, a second switch unit, a third switch unit, a fourth switch unit, a fifth switch unit, a sixth switch unit, a filter unit, and a control unit. The coil is connected to the first energy storage unit, the second switch unit and the third switch unit. The first energy storage unit and the first switch unit are connected to the fifth switch unit, and the first switch unit is connected with the filter unit and the fourth switch unit at a first connection node. The fourth switch unit is connected with the second switch unit and the second energy storage unit, and the second energy storage unit is connected with the fifth switch unit, the sixth switch units and the coil.

10 Claims, 20 Drawing Sheets

(58) Field of Classification Search
CPC ............ H02M 7/42; H02M 7/44; H02M 7/48; H02M 7/53; H02M 7/5387; H02M 7/53871; H02M 7/53873; H02M 7/53875; H02M 7/53876; H02M 7/53878; H02M 7/5388; H02M 7/539; H02M 7/5395
USPC ........................................................ 307/104
See application file for complete search history.

(56) References Cited

U.S. PATENT DOCUMENTS

2020/0220388 A1* 7/2020 Liu .................... H02J 50/23
2022/0231601 A1* 7/2022 Jong .................. H02M 1/0043

FOREIGN PATENT DOCUMENTS

| CN | 110492732 A | 11/2019 |
| CN | 111313707 A | 6/2020 |
| CN | 111934440 A | 11/2020 |
| CN | 112019052 A | 12/2020 |
| CN | 112104243 A | 12/2020 |

* cited by examiner

WIRELESS CHARGING RECEIVING CIRCUIT AND WIRELESS CHARGING RECEIVER

PRIORITY CLAIM

This application claims the benefit of and priority to Chinese patent Application No. 202110331887.2, filed on Mar. 29, 2021, which is hereby incorporated by reference in its entirety.

TECHNICAL FIELD

The present invention relates to the technical field of wireless charging, in particular to a wireless charging receiving circuit and a wireless charging receiver.

BACKGROUND

At present, the use of wireless charging technology to power batteries is becoming more and more popular in the industry. Since the energy is transmitted by the wireless charging transmitter in the form of a magnetic field, a wireless charging receiver must be used to convert the magnetic field energy into electrical energy. In order to achieve high efficiency and a wider range of applications, the input voltage of mobile devices is generally supplied by a USB adapter. The supply voltage of the USB adapter is in a range from 5 V to 20 V (e.g., USB PD controlled adapters). In industrial applications, many batteries have a voltage in a range from 9 V to 22.8 V. For example, the battery voltage of industrial drones is in a range from 11.4 V to 22.8 V, and the battery voltage of electrical tools is in a range from 9 V to 20 V. In order to minimize the power loss during battery charging to save costs, an efficient DC/DC conversion is required to increase the output voltage of the wireless charging receiver to a higher battery voltage. Then, a low-cost linear charger is used to charge the battery. The DC/DC converter based on a charge pump is the main topology to realize this voltage conversion, and the efficiency can reach 98% under a 1:2 boost ratio. For six batteries connected in series, two charge pump-based conversions (1:2 and then 2:4) are connected in cascade to increase the output voltage (e.g., 6 V) of the wireless charging receiver to the battery voltage (e.g., a voltage up to 24 V). Therefore, between the traditional wireless charging receiver and the battery charger, one or two 1:2 boost charge pump integrated circuit chips are used.

In practical applications, the wireless charging receiver and boost charge pump are usually placed together close to the wireless charging receiving coil. The linear charger is close to the battery or integrated in the battery. This is because the output current of the charge pump is one-half or one-fourth of the output current of the wireless charging receiver. Therefore, placing the charge pump close to the wireless charging receiving coil can minimize the resistive power loss of the PCB circuit.

In the prior art, a simplified system block diagram of the wireless charging receiver and boost charge pump is shown in FIG. 1. In FIG. 1, the wireless charging receiver 1000 and the boost charge pump 2000 are two independent ICs, that is, the two devices work completely independently. The wireless charging receiver needs to use capacitors for filtering at the output of the synchronous rectifier (comprising switch 1001, switch 1002, switch 1003, and switch 1004) and the output of the main LDO (switch 1005). In this kind of architecture, the power conversion path from the coil 1006 to the connection node P0 needs to pass through five switches, which hinders the minimization of power loss, resulting in low conversion efficiency.

SUMMARY

The embodiment of the present invention aims to provide a wireless charging receiving circuit and a wireless charging receiver, which can improve the power conversion efficiency of wireless charging.

In order to achieve the foregoing objectives, in the first aspect, the present invention provides a wireless charging receiving circuit including a coil, a first energy storage unit, a second energy storage unit, a first switch unit, a second switch unit, a third switch unit, a fourth switch unit, a fifth switch unit, a sixth switch unit, a filter unit and a control unit.

The first terminal of the coil is coupled to the first terminal of the first energy storage unit, the first terminal of the second switch unit, and the first terminal of the third switch unit. The second terminal of the first energy storage unit is connected to the first terminal of the first switch unit and the first terminal of the fifth switch unit. The second terminal of the first switch unit is connected to the first terminal of the filter unit and the first terminal of the fourth switch unit, and the second terminal of the fourth switch unit is connected to the second terminal of the second switch unit and the first terminal of the second energy storage unit. The second terminal of the second energy storage unit is connected to the second terminal of the fifth switch unit, the first terminal of the sixth switch unit, and the second terminal of the coil. The second terminal of the sixth switch unit, the second terminal of the filter unit and the second terminal of the third switch unit are all grounded, where the connection node between the second terminal of the first switch unit, the first terminal of the filter unit and the first terminal of the fourth switch unit is the first connection node.

The control unit is connected with each switch unit, and the control unit is used to control the conduction state of each switch unit, so that the voltage on the first connection node is an integer multiple of the effective value of the voltage across both terminals of the coil.

Optionally, the first switch unit includes a first switch. The third switch unit includes a third switch. The fourth switch unit includes a fourth switch, and the sixth switch unit includes a sixth switch. The first energy storage unit includes a first capacitor, and the second energy storage unit includes a second capacitor.

The first terminal of the first capacitor is connected to the first terminal of the coil, the first terminal of the second switch unit, and the drain of the third switch. The second terminal of the first capacitor is connected to the source of the first switch and the first terminal of the fifth switch unit. The drain of the first switch is connected to the first terminal of the filter unit and the drain of the fourth switch. The source of the fourth switch is connected to the second terminal of the second switch unit and the first terminal of the second capacitor. The second terminal of the second capacitor is connected to the second terminal of the fifth switch unit, the drain of the sixth switch and the second terminal of the coil. The source of the sixth switch and the source of the third switch are both grounded.

Optionally, the second switch unit includes a second switch, and the fifth switch unit includes a fifth switch.

The source of the second switch is connected to the first terminal of the coil. The drain of the second switch is connected to the first terminal of the second capacitor. The drain of the fifth switch is connected to the second terminal of the first capacitor, and the source of the fifth switch is connected to the second terminal of the coil.

Optionally, if the voltage across the coil is the input voltage, and the voltage on the first connection node is the output voltage, then the control unit is specifically used for the following two situations. Frist, when the alternating current signal on the coil is in the positive half cycle, the control unit is configured to control the first switch, the second switch, and the sixth switch to turn on, and at the same time control the remaining switches to turn off. Second, when the alternating current signal on the coil is in the negative half cycle, the third switch, the fourth switch and the fifth switch are controlled to be turned on, and the remaining switches are controlled to be turned off at the same time.

Optionally, if the voltage on the first connection node is the input voltage, and the voltage across the coil is the output voltage, then the control unit is specifically used for the following situation. The combination of the first switch, the second switch and the sixth switch, and the combination of the third switch, the fourth switch, and the fifth switch are alternately turned on at a preset frequency.

Optionally, the wireless charging receiving circuit further includes two type-I expansion units, and the two type-I expansion units are used to convert the ratio of the effective value of the amplitude of the AC voltage signal across the coil to the voltage at the first connection node to 1:3.

Optionally, the type-I expansion unit includes a third capacitor, a first expansion switch, a second expansion switch, and a third expansion switch.

The first terminal of the third capacitor is connected to the drain of the first expansion switch. The second terminal of the third capacitor is connected to the source of the second expansion switch and the drain of the third expansion switch. The source of the first expansion switch is connected to the drain of the second expansion switch.

Optionally, the drain of the first expansion switch of the first type-I expansion unit is connected to the source of the first switch, and the source of the first expansion switch of the type-I expansion unit is connected to the second terminal of the first capacitor. The source of the third expansion switch of the first type-I expansion unit is connected to the first terminal of the coil.

The drain of the first expansion switch of the second type-I expansion unit is connected to the source of the fourth switch, and the source of the first expansion switch of the second type-I expansion unit is connected to the first terminal of the second capacitor. The source of the third expansion switch of the second type-I expansion unit is connected to the second terminal of the coil.

The control unit is specifically used for the following two situations. First, when the alternating current signal on the coil is in the positive half cycle, the control unit is configured to control the first switch, the second switch, the sixth switch, and the second expansion switch of the first type-I expansion unit, the first expansion switch and the third expansion switch of the second type-I expansion unit to be turned on, while controlling the other switches to be turned off. Second, when the alternating current signal on the coil is in the negative half cycle, the control unit is configured to control the third switch, the fourth switch, the fifth switch, the first expansion switch and the third expansion switch of the first type-I expansion unit, and the second expansion switch of the second type-I expansion unit to be turned on, and control the other switches to be turned off at the same time.

Optionally, the drain of the first expansion switch of the first type-I expansion unit is connected to the source of the first switch, and the source of the first expansion switch of the first type-I expansion unit is connected to the second terminal of the first capacitor. The source of the third expansion switch of the first type-I expansion unit is grounded;

The drain of the first expansion switch of the second type-I expansion unit is connected to the source of the fourth switch, and the source of the first expansion switch of the second type-I expansion unit is connected to the first terminal of the second capacitor. The source of the third expansion switch of the second type-I expansion unit is grounded;

The control unit is specifically used for the following two situations. First, when the alternating current signal on the coil is in the positive half cycle, the control unit is configured to control the second switch, the fourth switch, the sixth switch, and the first expansion switch and the third expansion switch of the first type-I expansion unit and the second expansion switch of the second type-I expansion unit to be turned on, while controlling the remaining switches to be turned off. Second, when the alternating current signal on the coil is in the negative half cycle, the control unit is configured to control the first switch, the third switch, the fifth switch, and the second expansion switch of the first type-I expansion unit and the first expansion switch and the third expansion switch of the second type-I expansion unit to be turned on, and control the remaining switches to be turned off at the same time.

Optionally, the wireless charging receiving circuit further includes a third and a fourth type-I expansion units, and the third and fourth type-I expansion units are used to convert the ratio of the effective value of the amplitude of the AC voltage signal across the coil to the voltage on the first connection node to 1:4.

Optionally, the drain of the first expansion switch of the third type-I expansion unit is connected to the source of the first switch, and the source of the first expansion switch of the third type-I expansion unit is connected to the first terminal of the third capacitor of the first type-I expansion unit. The source of the third expansion switch of the third type-I expansion unit is connected to the second terminal of the third capacitor of the first type-I expansion unit.

The drain of the first expansion switch of the fourth type-I expansion unit is connected to the source of the fourth switch, and the source of the first expansion switch of the fourth type-I expansion unit is connected to the first terminal of the third capacitor of the second type-I expansion unit. The source of the third expansion switch of the fourth type-I expansion unit is connected to the second terminal of the third capacitor of the second type-I expansion unit.

The control unit is specifically used for the following two situations. First, when the alternating current signal on the coil is in the positive half cycle, the control unit is configured to control the first switch, the second switch, the sixth switch, and the second expansion switch of the first type-I expansion unit, the first expansion switch and the third expansion switch of the second type-I expansion unit, the second expansion switch of the third type-I expansion unit, and the first expansion switch and the third expansion switch of the fourth type-I expansion unit to be turned on, and control the other switches to be turned off at the same time. Second, when the alternating current signal on the coil is in the negative half cycle, the control unit is configured to control the third switch, the fourth switch, the fifth switch, and the first expansion switch and the third expansion switch of the first type-I expansion unit, the second expansion switch of the second type-I expansion unit, the first expansion switch and the third expansion switch of the third type-I expansion unit, and the second expansion switch of the fourth type-I expansion unit to be turned on, and control the other switches to be turned off at the same time.

Optionally, the wireless charging receiving circuit further includes two type-II expansion units, and the two type-II expansion units are used to convert the ratio of the effective value of the amplitude of the AC voltage signal across the coil to the voltage at the first connection node to 1:5.

Optionally, the type-II expansion unit includes a fourth capacitor, a fourth expansion switch, a fifth expansion switch, and a sixth expansion switch.

The first terminal of the fourth capacitor is connected to the drain of the fourth expansion switch, and the second terminal of the fourth capacitor is connected to the source of the fifth expansion switch and the drain of the sixth expansion switch.

Optionally, the drain of the fourth expansion switch of the first type-II expansion unit is connected to the source of the first switch. The source of the fourth expansion switch of the first type-II expansion unit is connected to the first terminal of the third capacitor of the first type-I expansion unit, and the drain of the fifth expansion switch of the first type-II expansion unit is connected to the second terminal of the first capacitor. The source of the sixth expansion switch of the first type-II expansion unit is grounded.

The drain of the fourth expansion switch of the second type-II expansion unit is connected to the source of the fourth switch. The source of the fourth expansion switch of the second type-II expansion unit is connected to the first terminal of the third capacitor of the second type-I expansion unit, and the drain of the fifth expansion switch of the second type-II expansion unit is connected to the first terminal of the second capacitor. The source of the sixth expansion switch of the second type-II expansion unit is grounded.

The control unit is specifically used for the following two situations. First, when the alternating current signal on the coil is in the positive half cycle, the control unit is configured to control the first switch, the second switch, the sixth switch, and the first expansion switch and the third expansion switch of the first type-I expansion unit, the second expansion switch of the second type-I expansion unit, the fifth expansion switch of the first type-II expansion unit, and the fourth expansion switch and the sixth expansion switch of the second type-II expansion unit to be turned on, and control the remaining switches to be turned off at the same time. Second, when the alternating current signal on the coil is in the negative half cycle, the control unit is configured to control the third switch, the fourth switch, the fifth switch, and the second expansion switch of the first type-I expansion unit, the first expansion switch and the third expansion switch of the second type-I expansion unit, the fourth expansion switch and the sixth expansion switch of the first type-II expansion unit, and the fifth expansion switch of the second type-II expansion unit to be turned on, and control the remaining switches to be turned off at the same time.

Optionally, the second switch unit includes a seventh switch and an eighth switch, and the fifth switch unit includes a ninth switch and a tenth switch.

The source of the seventh switch is connected to the first terminal of the coil, and the drain of the seventh switch is connected to the source of the eighth switch. The drain of the eighth switch is connected to the first terminal of the second capacitor. The drain of the ninth switch is connected to the second terminal of the first capacitor, and the source of the ninth switch is connected to the drain of the tenth switch. The source of the tenth switch is connected to the second terminal of the coil, and at the same time, the drain of the seventh switch is also connected to the source of the ninth switch. The source of the eighth switch is also connected to the drain of the tenth switch, and the connection node between the drain of the seventh switch and the source of the ninth switch is connected to the connection node between the source of the eighth switch and the drain of the tenth switch.

Optionally, if the voltage across the coil is the input voltage, the voltage on the first connection node is the output voltage.

The control unit is specifically used for the following two situations. First, when the alternating current signal on the coil is in the positive half cycle, the first switch, the sixth switch, the seventh switch, and the eighth switch are controlled to be turned on, while controlling the rest of the switches to be turned off. Second, when the alternating current signal on the coil is in the negative half cycle, the third switch, the fourth switch, the ninth switch and the tenth switch are controlled to be turned on, while controlling the rest of the switches to be turned off.

Optionally, if the voltage on the first connection node is the input voltage, and the voltage across the coil is the output voltage, then the control unit is specifically used for the following situation. The combination of the first switch, the sixth switch, the seventh switch and the eighth switch and the combination of the third switch, the fourth switch, the ninth switch and the tenth switch are alternately turned on at a preset frequency.

Optionally, the wireless charging receiving circuit further includes a seventh switch unit.

The connection node between the seventh switch and the ninth switch is connected to the first terminal of the seventh switch unit, and the connection node between the eighth switch and the tenth switch is connected to the second terminal of the seventh switch unit.

Optionally, the seventh switch unit includes an eleventh switch and a twelfth switch.

The connection node between the seventh switch and the ninth switch is connected to the drain of the eleventh switch, and the connection node between the eighth switch and the tenth switch is connected to the drain of the twelfth switch. The source of the eleventh switch is connected to the source of the twelfth switch.

Optionally, the wireless charging receiving circuit further includes two type-III expansion units, and the two type-III expansion units are used to convert the ratio of the effective value of the amplitude of the AC voltage signal across the coil to the voltage at the first connection node to 1:3.

Optionally, the type-III expansion unit includes a fifth capacitor, a seventh expansion switch, an eighth expansion switch, and a ninth expansion switch.

The first terminal of the fifth capacitor is connected to the drain of the seventh expansion switch. The second terminal of the fifth capacitor is connected to the source of the eighth expansion switch and the drain of the ninth expansion switch. The source of the seventh expansion switch is connected to the drain of the eighth expansion switch.

Optionally, the drain of the seventh expansion switch of the first type-III expansion unit is connected to the source of the first switch, and the source of the seventh expansion switch of the first type-III expansion unit is connected to the second terminal of the first capacitor. The source of the ninth expansion switch of the first type-III expansion unit is connected to the first terminal of the coil.

The drain of the seventh expansion switch of the second type-III expansion unit is connected to the source of the fourth switch, and the source of the seventh expansion switch of the second type-III expansion unit is connected to the first terminal of the second capacitor. The source of the ninth expansion switch of the second type-III expansion unit is connected to the second terminal of the coil.

The control unit is specifically used for the following two situations. First, when the alternating current signal on the coil is in the positive half cycle, the first switch, the sixth switch, the seventh switch, the eighth switch, and the eighth expansion switch of the first type-III expansion unit, and the seventh expansion switch and the ninth expansion switch of the second type-III expansion unit are turned on, and the remaining switches are controlled to be turned off at the same time. Second, when the alternating current signal on the coil is in the negative half cycle, the third switch, the fourth switch, the ninth switch, the tenth switch, and the seventh expansion switch and the ninth expansion switch of the first type-III expansion unit and the eighth expansion switch of the second type-III expansion unit are turned on, and the remaining switches are controlled to be turned off at the same time.

Optionally, the type-IV expansion unit includes a sixth capacitor, a tenth expansion switch, an eleventh expansion switch, and a twelfth expansion switch.

The first terminal of the sixth capacitor is connected to the drain of the tenth expansion switch, and the second terminal of the sixth capacitor is connected to the source of the eleventh expansion switch and the drain of the twelfth expansion switch.

Optionally, the drain of the tenth expansion switch of the first type-IV expansion unit is connected to the source of the first switch, and the source of the tenth expansion switch of the first type-IV expansion unit is connected to the second terminal of the first capacitor. The drain of the eleventh expansion switch of the first type-IV expansion unit is connected to the connection node between the drain of the seventh switch and the source of the ninth switch. The source of the twelfth expansion switch of the first type-IV expansion unit is grounded.

The drain of the tenth expansion switch of the second type-IV expansion unit is connected to the source of the fourth switch, and the source of the tenth expansion switch of the second type-IV expansion unit is connected to the first terminal of the second capacitor. The drain of the eleventh expansion switch of the second type-IV expansion unit is connected to the connection node between the source of the eighth switch and the drain of the tenth switch. The source of the twelfth expansion switch of the second type-IV expansion unit is grounded.

The control unit is specifically used for the following two situations. First, when the alternating current signal on the coil is in the positive half cycle, the fourth switch, the sixth switch, the seventh switch, the eighth switch, and the tenth expansion switch and the twelfth expansion switch of the first type-IV expansion unit and the eleventh expansion switch of the second type-IV expansion unit are turned on, and the remaining switches are controlled to be turned off at the same time. Second, when the alternating current signal on the coil is in the negative half cycle, the first switch, the third switch, the ninth switch, the tenth switch, the eleventh expansion switch of the first type-IV expansion units, and the tenth expansion switch and the twelfth expansion switch of the second type-IV expansion unit are turned on, and the remaining switches are controlled to be turned off at the same time.

Optionally, the wireless charging receiving circuit further includes an eighth switch unit and a ninth switch unit.

The eighth switch unit is connected in series with the first energy storage unit, and the ninth switch unit is connected in series with the second energy storage unit.

Optionally, the eighth switch unit includes a thirteenth switch, and the ninth switch unit includes a fourteenth switch.

The drain of the thirteenth switch is connected to the first terminal of the first capacitor, and the source of the thirteenth switch is connected to the first terminal of the coil. The drain of the fourteenth switch is connected to the second terminal of the second capacitor, and the source of the fourteenth switch is connected to the second terminal of the coil.

Optionally, the wireless charging receiving circuit further includes a linear voltage stabilization unit.

The linear voltage stabilization unit is connected to the filter unit and the load, and the linear voltage stabilization unit is used to adjust the voltage difference between the first connection node and the load or the voltage flowing through the linear voltage stabilization unit.

Optionally, the linear voltage stabilization unit includes a fifteenth switch and a seventh capacitor.

The drain of the fifteenth switch is connected to the filter unit, and the source of the fifteenth switch is connected to the first terminal of the seventh capacitor and the load. The second terminal of the seventh capacitor is grounded.

Optionally, the filter unit includes a filter capacitor. The first terminal of the filter capacitor is connected to the drain of the first switch and the drain of the fourth switch, and the second terminal of the filter capacitor is grounded.

In the second aspect, the present invention provides a wireless charging receiver including the wireless charging receiving circuit as described above.

The beneficial effects of the embodiments of the present invention include the following. The embodiments of the present invention disclose a wireless charging receiving circuit and a wireless charging receiver. The wireless charging receiving circuit includes a coil, a first energy storage unit, a second energy storage unit, a first switch unit, a second switch unit, a third switch unit, a fourth switch unit, a fifth switch unit, a sixth switch unit, a filter unit and a control unit, where the first terminal of the coil is connected to the first terminal of the first energy storage unit, the first terminal of the second switch unit and the first terminal of the third switch unit. The second terminal of the first energy storage unit is connected to the first terminal of the first switch unit and the first terminal of the fifth switch unit, the second terminal of the first switch unit is connected to the first terminal of the filter unit and the first terminal of the fourth switch unit. The second terminal of the fourth switch unit is connected to the second terminal of the second switch unit and the first terminal of the second energy storage unit. The second terminal of the second energy storage unit is connected to the second terminal of the fifth switch unit, the first terminal of the sixth switch unit and the second terminal of the coil. The second terminal of the sixth switch unit and the second terminal of the filter unit and the second terminal of the third switch unit are all grounded. The connection node between the second terminal of the first switch unit and the first terminal of the filter unit and the first terminal of the fourth switch unit is the first connection node. The control unit is connected to each switch unit. The control unit is used to control the conduction state of each switch unit so that the voltage at the first connection node is an integer multiple of the effective value of the voltage on the coil. Through above method, the power conversion efficiency of wireless charging can be improved.

BRIEF DESCRIPTION OF THE DRAWINGS

One or more embodiments are exemplified by the pictures in the corresponding drawings. These exemplified descriptions do not constitute a limitation on the embodiments. The elements with the same reference numerals in the drawings are denoted as similar elements. Unless otherwise stated, the attached drawings do not constitute a scale limitation.

DETAILED DESCRIPTION OF ILLUSTRATIVE EMBODIMENTS

In order to make the purpose, technical solutions, and advantages of the embodiments of the present application clearer, the following will clearly and completely describe the technical solutions in the embodiments of the present application with reference to the drawings in the embodiments of the present application. Obviously, the described embodiments are a part of the embodiments of the present invention, but not all of the embodiments. Based on the embodiments of the present invention, all other embodiments obtained by those of ordinary skill in the art without creative work shall fall within the protection scope of the present invention.

Figure 2:
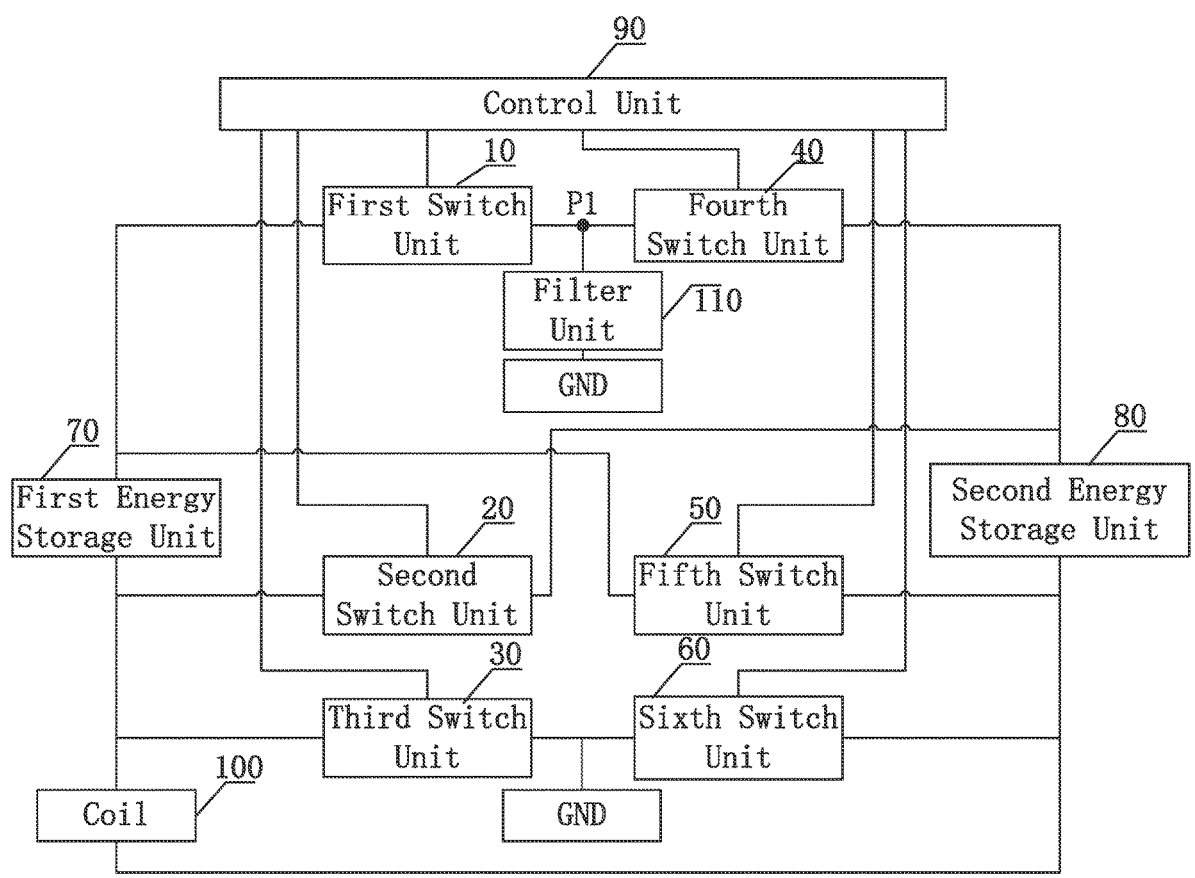
FIG. 2 is a schematic structural diagram of a wireless charging receiving circuit provided by an embodiment of the present invention.

Please refer to FIG. 2, which is a schematic structural diagram of a wireless charging receiving circuit provided by an embodiment of the application. As shown in FIG. 2, the wireless charging receiving circuit includes a first switch unit 10, a second switch unit 20, a third switch unit 30, a fourth switch unit 40, a fifth switch unit 50, a sixth switch unit 60, and a first energy storage unit 70, a second energy storage unit 80, a control unit 90, a coil 100 and a filter unit 110.

The first terminal of the coil 100 is connected to the first terminal of the first energy storage unit 70, the first terminal of the second switch unit 20, and the first terminal of the third switch unit 30. The second terminal of the first energy storage unit 70 is connected to the first terminal of the first switch unit 10 and the first terminal of the fifth switch unit 50. The second terminal of the first switch unit 10 is connected to the first terminal of the filter unit 110 and the first terminal of the fourth switch unit 40. The second terminal of the fourth switch unit 40 is connected to the second terminal of the second switch unit 20 and the first terminal of the second energy storage unit 80. The second terminal of the second energy storage unit 80 is connected to the second terminal of the fifth switch unit 50, the first terminal of the sixth switch unit 60, and the second terminal of the coil 100. The second terminal of the sixth switch unit 60, the second terminal of the filter unit 110 and the second terminal of the third switch unit 30 are all connected to GND. The connection node between the second terminal of the first switch unit 10, the first terminal of the filter unit 110 and the first terminal of the fourth switch unit 40 is the first connection node P1.

At the same time, the control unit 90 is connected to each switch unit, that is, the control unit 90 is connected to the first switch unit 10, the second switch unit 20, the third switch unit 30, the fourth switch unit 40, the fifth switch unit 50, and the sixth switch unit 60 respectively.

Specifically, the control unit 90 is used to control the conduction state (including the on state and the off state) of each switch unit, so that the voltage at the first connection node P1 is an integer multiple of the effective value of the voltage across the two terminals of coil 100. If the voltage across the coil 100 is the input voltage, and the voltage on the first connection node P1 is the output voltage, then the control unit 90 can make the voltage on the first connection node P1 twice of the effective value of the voltage across the coil 100 by controlling the conduction state of each switch unit. If the voltage across the coil 100 is the output voltage, and the voltage on the first connection node P1 is the input voltage, the control unit 90 can make the voltage on the first connection node P1 equal to twice of the effective value of the voltage across the coil 100 by controlling the conduction state of each switch unit.

Figure 3:
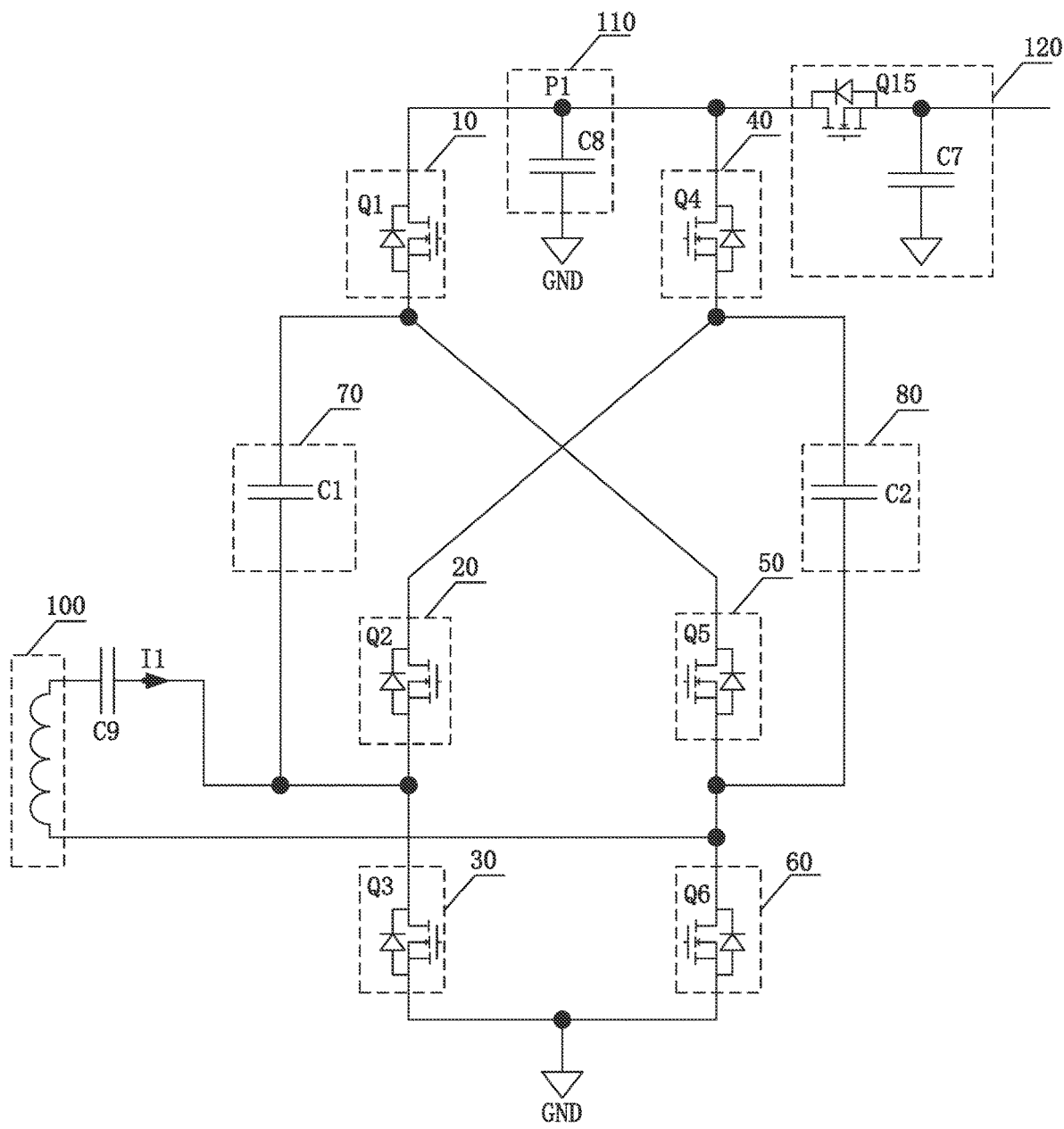
FIG. 3 is a schematic diagram of a circuit structure of a wireless charging receiving circuit provided by an embodiment of the present invention to realize a 1:2 voltage boost mode.

In one embodiment, as shown in FIG. 3, the first switch unit 10 includes a first switch Q1. The third switch unit 30 includes a third switch Q3. The fourth switch unit 40 includes a fourth switch Q4. The sixth switch unit 60 includes a sixth switch Q6. The first energy storage unit 70 includes a first capacitor C1, and the second energy storage unit 80 includes a second capacitor C2.

As shown in FIG. 3, the first terminal of the first capacitor C1 is connected to the first terminal of the coil 100, the first terminal of the second switch unit 20, and the drain of the third switch Q3. The second terminal of the first capacitor C1 is connected to the source of the first switch Q1 and the first terminal of the fifth switch unit 50. The drain of the first switch Q1 is connected to the first terminal of the filter unit 110 and the drain of the fourth switch Q4. The source of the fourth switch Q4 is connected to the second terminal of the second switch unit 20 and the first terminal of the second capacitor C2. The second terminal of the second capacitor C2 is connected to the second terminal of the fifth switch unit 50, the drain of the sixth switch Q6 and the second terminal of the coil 100. The source of the sixth switch Q6 and the source of the third switch Q3 are both grounded to GND.

Optionally, the second switch unit 20 includes a second switch Q2, and the fifth switch unit 50 includes a fifth switch Q5. The source of the second switch Q2 is connected to the first terminal of the coil 100, and the drain of the second switch Q2 is connected to the first terminal of the second capacitor C2. The source of the fifth switch Q5 is connected to the second terminal of the first capacitor C1, and the drain of the fifth switch Q5 is connected to the second terminal of the coil 100.

Optionally, the filter unit 110 includes a filter capacitor C8. The first terminal of the filter capacitor C8 is connected to the drain of the first switch Q1 and the drain of the fourth switch Q4. The second terminal of the filter capacitor C8 is grounded.

Specifically, when the coil 100 is used as the receiving coil 100 of the wireless charging receiving circuit, that is, the voltage across the coil 100 is the input voltage, the voltage on the first connection node P1 is the output voltage. At this time, the signal on the coil 100 is an alternating current (AC) signal.

It should be understood that the filter unit 110 including the filter capacitor C8 can be applied in any embodiment of the present application.

Figure 3A:
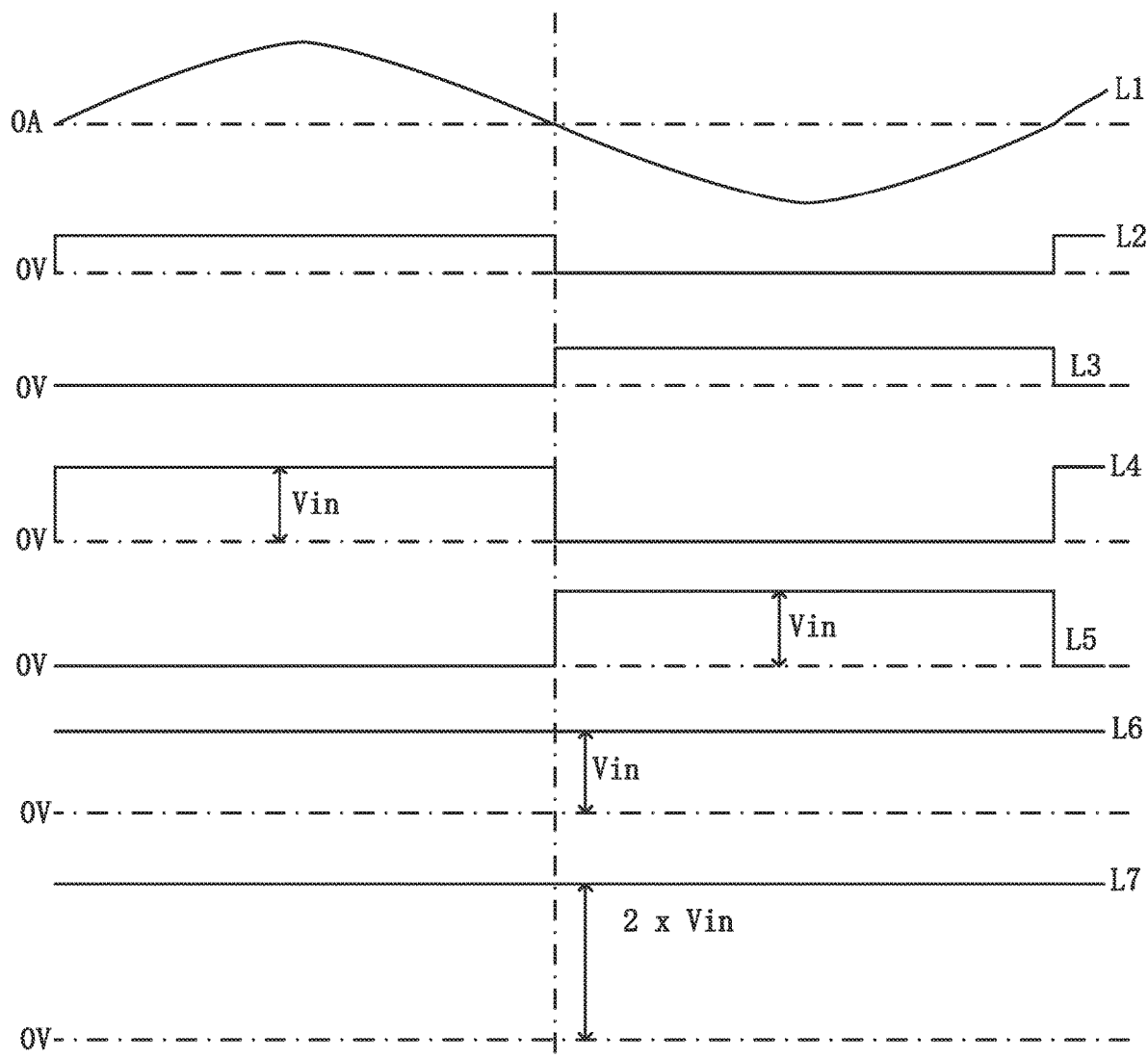
FIG. 3A is a waveform of the circuit in FIG. 3 operating in a boost mode provided by an embodiment of the present invention.

Please refer to FIG. 3A. In FIG. 3A, the curve L1 represents the alternating current signal I1 on the coil 100. The curve L2 represents the control signals of the first switch Q1, the second switch Q2, and the sixth switch Q6. The curve L3 represents the control signals of the third switch Q3, the fourth switch Q4 and the fifth switch Q5. The curve L4 represents the voltage waveform of the first terminal of the coil 100. The curve L5 represents the voltage waveform of the second terminal of the coil 100. The curve L6 represents the voltage waveform across the first capacitor C1 or the second capacitor C2. The curve L7 represents the voltage waveform on the first connection node P1. It can be seen from curve L1, curve L2, curve L4, curve L6, and curve L7 that when the alternating current signal I1 on the coil 100 is in the positive half cycle, the control unit 90 controls the first switch Q1, the second switch Q2, and the sixth switch Q6 to turn on, and the other switches are controlled to be turned off at the same time. Then, part of the alternating current signal I1 on the coil 100 discharges the first capacitor C1 and charges the filter capacitor C8 through the first switch Q1 and the sixth switch Q6. Assuming that the effective value of the voltage at the first terminal of the coil 100 is Vin during this process, the voltage across the first capacitor C1 is maintained at a level approximately equal to Vin, so the voltage at the second terminal of the first capacitor C1 with reference to ground is twice Vin, and so that the voltage at the first connection node P1 (that is, the voltage on the filter capacitor C8) also reaches twice Vin. The other part of the alternating current signal I1 on the coil 100 charges the second capacitor C2 through the second switch Q2 to keep its voltage at Vin. Moreover, the control unit 90 controls the first switch Q1, the second switch Q2 and the sixth switch Q6 to be off when the alternating current signal I1 of the coil 100 reaches zero, to reduce switching losses.

In the negative half cycle of the alternating current signal I1 on the coil 100, it can be seen from the curve L1, the curve L3, the curve L5, the curve L6 and the curve L7 that the control unit 90 controls the third switch Q3, the fourth switch Q4 and the fifth switch Q5 to be turned on, and the other switches are controlled to be turned off. At this time, a portion of the alternating current signal I1 on the coil 100 discharges the second capacitor C2 and charges the filter capacitor C8 through the third switch Q3 and the fourth switch Q4. Also, suppose in this process that the effective value of the voltage at the second terminal of the coil 100 is Vin, then the voltage across the second capacitor C2 remains at a level approximately equal to Vin, so the voltage between the first terminal of the second capacitor C2 and ground is twice Vin. The voltage on the filter capacitor C8 (that is, the voltage between the first connection node P1 and ground) also continues to be maintained at twice Vin. The other portion of the alternating current signal I1 on the coil 100 charges the first capacitor C1 through the fifth switch Q5 to keep its voltage at Vin. In addition, the third switch Q3, the fourth switch Q4, and the fifth switch Q5 are controlled to be turned off when the alternating current signal I1 on the coil 100 reaches zero, to reduce switching losses.

By repeating the above two processes, the process of using the alternating current signal I1 on the coil 100 to charge and discharge the first capacitor C1 and the second capacitor C2 can be realized, and each switch on the charging and discharging path can be turned on or off under zero current switching. That is, the energy of the coil 100 is alternately transferred to the first capacitor C1, the second capacitor C2, and the filter capacitor C8, so that the voltage across the filter capacitor C8 (the voltage at the first connection node P1) is kept close to twice of the effective value Vin of the voltage on the coil 100. At the same time, each switch in the circuit works at the same switching frequency, and the switching frequency is the operating frequency of the wireless charging transmitter. Moreover, the voltage on the first connection node P1 (that is, the output voltage) can be continuously monitored, so as to control the output power of the wireless charging transmitter according to different load states to adjust the voltage on the first connection node P1.

Figure 1:
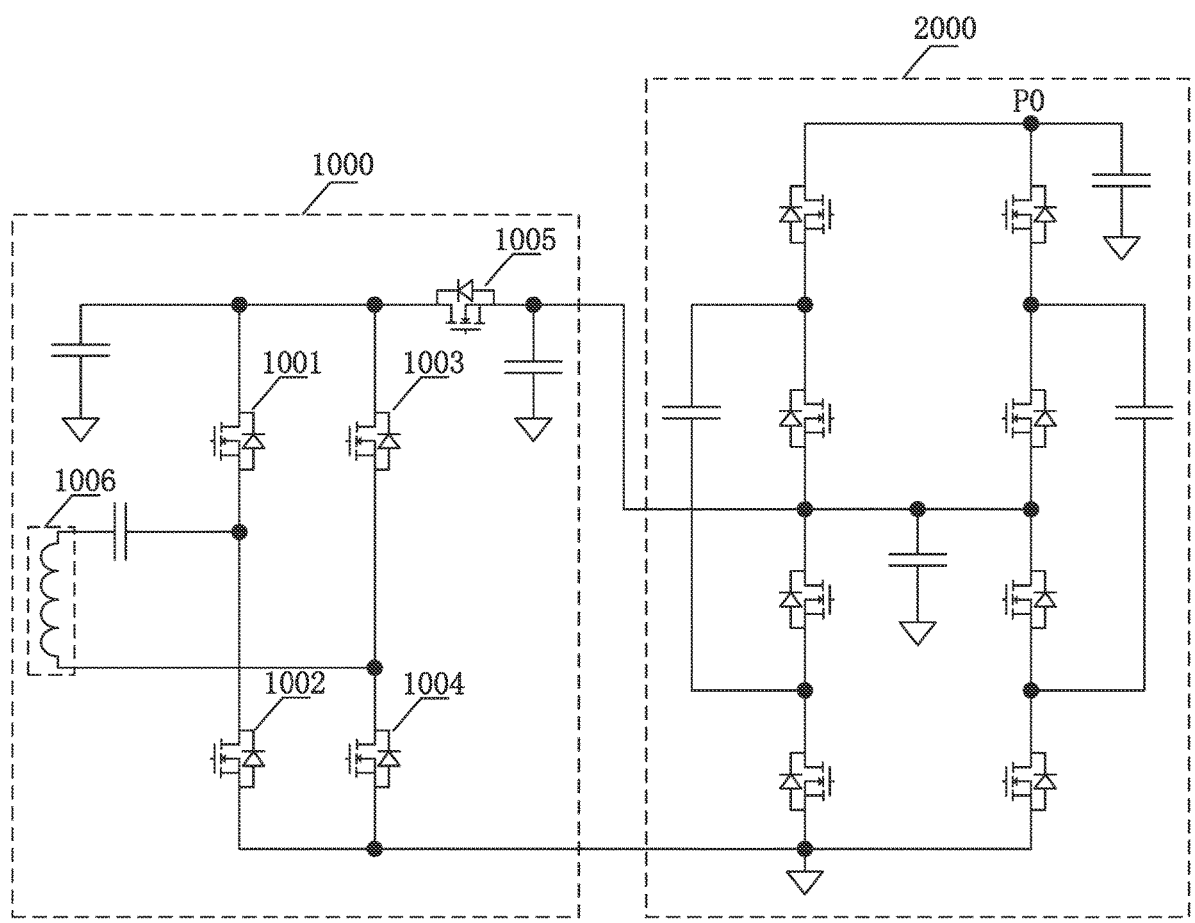
FIG. 1 is a schematic diagram of the circuit structure of a wireless charging receiver in the prior art.

In summary, under the same condition that it can output twice the effective value of the coil 100 voltage, in the wireless charging receiving circuit provided by the embodiment of the present application, the charging path from the coil 100 to the filter capacitor C8 (that is, the charging path from the coil 100 at the receiving terminal to the first connection node P1 of the output terminal) only needs three switches, which is two switches less than that in the prior art. At the same time, the number of switches on the charging path of the first capacitor C1 or the second capacitor C2 is also one less than that in FIG. 1. Therefore, through the above-mentioned solution, the conversion efficiency can be improved.

Further, the wireless charging receiving circuit may further includes a linear voltage stabilization unit 120, which is connected to the filter unit 110 and the load. The linear voltage stabilization unit 120 is used to adjust the voltage difference between the filter unit 110 and the load or the current flowing into the load.

In one embodiment, the linear voltage stabilization unit 120 includes a fifteenth switch Q15 and a seventh capacitor C7. The drain of the fifteenth switch Q15 is connected to the filter unit 110, and the source of the fifteenth switch Q15 is connected to the first terminal of the seventh capacitor C7 and the load. The second terminal of the seventh capacitor C7 is grounded.

After the voltage across the filter capacitor C8 exceeds the preset value, the control unit 90 controls the fifteenth switch Q15 to be turned on, and also controls and adjusts the voltage at the output port of the linear voltage stabilization unit (that is, the source of the fifteenth switch Q15) or the current passing through it. It should be understood that the linear voltage stabilization unit can be applied to any embodiments in the present application.

Conversely, when the voltage across the coil 100 is the output AC voltage and the voltage on the first connection node P1 is the input voltage, that is, the first connection node P1 is used as a DC input source, and the coil 100 is used as the wireless power transmitting coil 100. At this time, the combination of the first switch Q1, the second switch Q2 and the sixth switch Q6 and the combination of the third switch Q3, the fourth switch Q4 and the fifth switch Q5 are turned on alternately at a preset frequency.

Suppose that the combination of the first switch Q1, the second switch Q2, and the sixth switch Q6 is regarded as the first switch combination, and the combination of the third switch Q3, the fourth switch Q4, and the fifth switch Q5 is regarded as the second switch combination. When the first switch combination is turned on, and the second switch combination is turned off, the filter capacitor C8 charges the first capacitor C1 and the second capacitor C2 in series through the first switch Q1, the second switch Q2, and the sixth switch Q6. The voltage across the first capacitor C1 and the second capacitor C2 is about half of the voltage across the filter capacitor C8. At the same time, the voltage across the coil 100 is the same as the voltage across the second capacitor C2. Then, when the second switch combination is turned on, and the first switch combination is turned off, the filter capacitor C8 charges the first capacitor C1 and the second capacitor C2 in series through the third switch Q3, the fourth switch Q4, and the fifth switch Q5. The voltage across the first capacitor C1 and the second capacitor C2 is about half of the voltage across the filter capacitor C8. At the same time, the voltage between the two terminals of the coil 100 is the same as the voltage across the second capacitor C2. In the above-mentioned manner, it is repeated to realize the inversion of the DC power input at the first connection node P1. An AC voltage with half amplitude of the voltage on the first connection node P1 is formed on the coil 100, and an AC current is formed on the coil 100.

Figure 4:
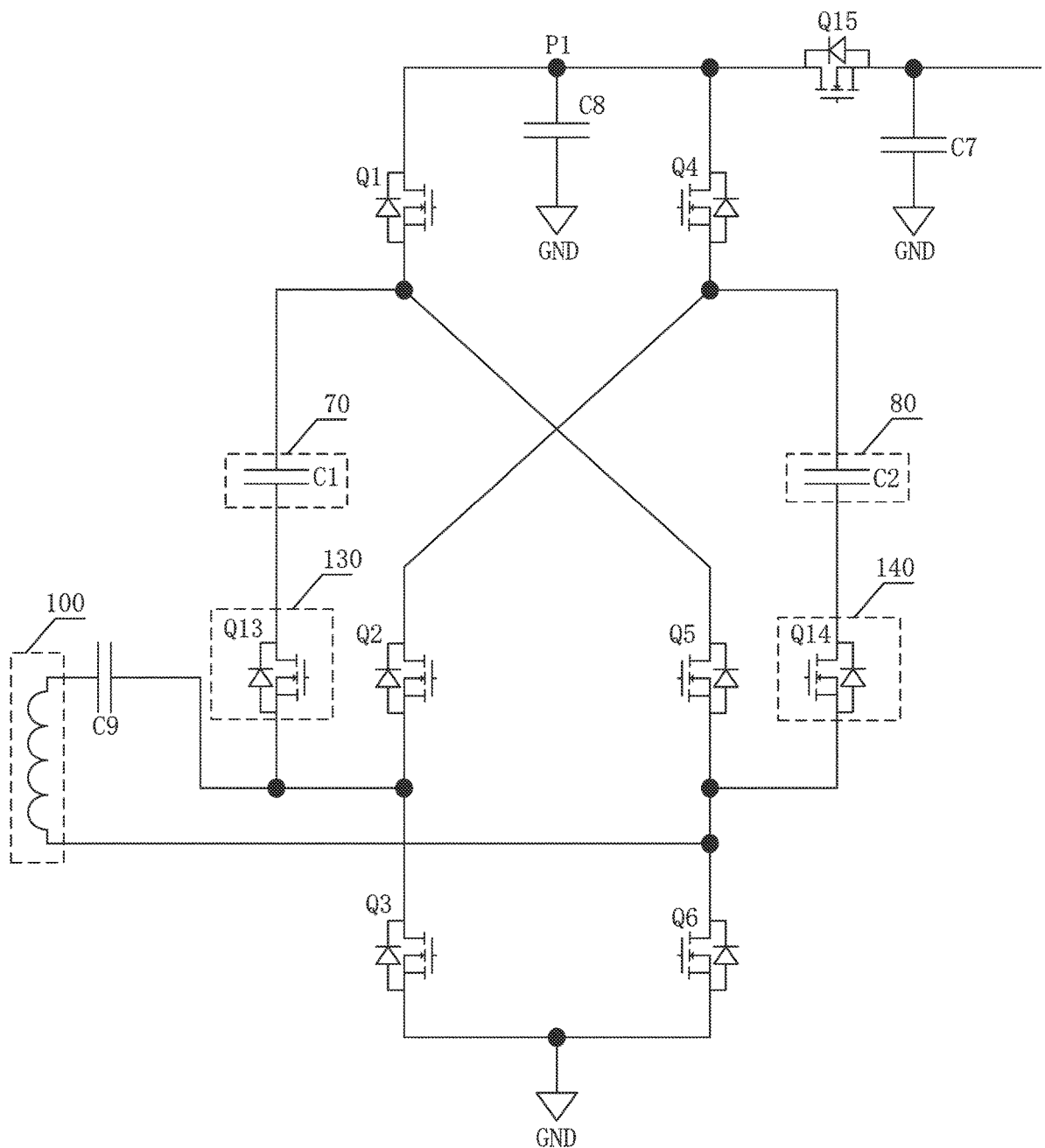
FIG. 4 is a schematic diagram of a circuit structure of a wireless charging receiving circuit provided by an embodiment of the present invention to realize a 1:1 pass-through mode.

In one embodiment, as shown in FIG. 4, the wireless charging receiving circuit further includes an eighth switch unit 130 and a ninth switch unit 140. The first terminal of the eighth switch unit 130 is connected to the first terminal of the coil 100, and the second terminal of the eighth switch unit 130 is connected to the first terminal of the first energy storage unit 70. The first terminal of the ninth switch unit 140 is connected to the second terminal of the coil 100, and the second terminal of the ninth switch unit 140 is connected to the second terminal of the second energy storage unit 80.

In alternative embodiments, the eighth switch unit 130 including a thirteenth switch Q13, and the ninth switch unit 140 including a fourteenth switch Q14. The drain of the thirteenth switch Q13 and the first terminal of the first capacitor C1 are connected. The source of the thirteenth switch Q13 is connected to the first terminal of the coil 100. The drain of the fourteenth switch Q14 is connected to the second terminal of the second capacitor C2, and the source of the fourteenth switch Q14 is connected to the second terminal of the coil 100.

The thirteenth switch Q13 and the fourteenth switch Q14 are used to implement a 1:1 pass-through mode, that is, the ratio of the effective value of the amplitude of the AC voltage signal across the coil 100 to the voltage on the first connection node P1 is 1:1. At this time, the control unit 90 controls the second switch Q2 and the fifth switch Q5 to be always on, and controls the thirteenth switch Q13 and the fourteenth switch Q14 to be always off. Then, the first switch Q1, the third switch Q3, the fourth switch Q4, and the sixth switch Q6 form a full-wave rectifier circuit. Thus, a 1:1 pass-through mode is realized. Of course, if the control unit 90 controls the thirteenth switch Q13 and the fourteenth switch Q14 to be always on, the wireless charging receiving circuit still converts the ratio of the effective value of the amplitude of the AC voltage signal on the coil 100 to the voltage on the first connection node P1 to 1:2. Of course, in other embodiments, the two terminals of the eighth switch unit 130 can be connected to the second terminal of the first energy storage unit 70 and the first terminal of the first switch unit 10 respectively. The two terminals of the ninth switch unit 140 can be connected to the second terminal of the fourth switch unit 40 and the first terminal of the second energy storage unit 80 respectively.

Figure 5:
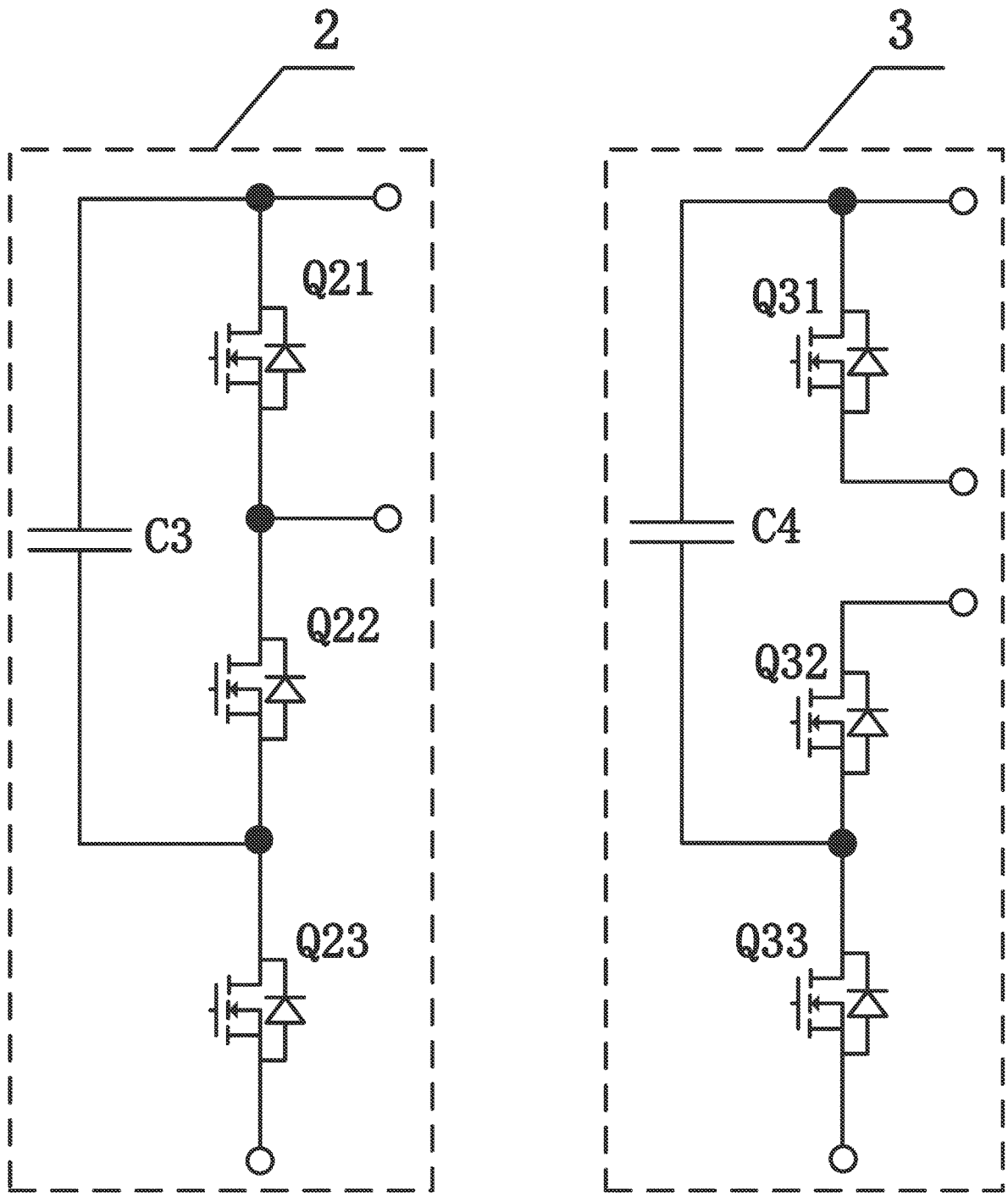
FIG. 5 is a schematic diagram of the circuit structure of a type-I expansion unit and a type-II expansion unit provided by an embodiment of the present invention.

In an embodiment, as shown in FIG. 5, the wireless charging receiving circuit further includes a type-I expansion unit 2. The type-I expansion unit 2 includes a third capacitor C3, a first expansion switch Q21, a second expansion switch Q22, and a third expansion switch Q23. The first terminal of the third capacitor C3 is connected to the drain of the first expansion switch Q21. The second terminal of the third capacitor C3 is connected to the source of the second expansion switch Q22 and the drain of the third expansion switch Q23. The source of the first expansion switch Q21 is connected to the drain of the second expansion switch Q22.

Optionally, the wireless charging receiving circuit further includes two type-I expansion units, and the two type-I expansion units are used to convert the ratio of the effective value of the amplitude of the AC voltage signal across the coil 100 to the voltage at the first connection node P1 to 1:3.

Figure 6:
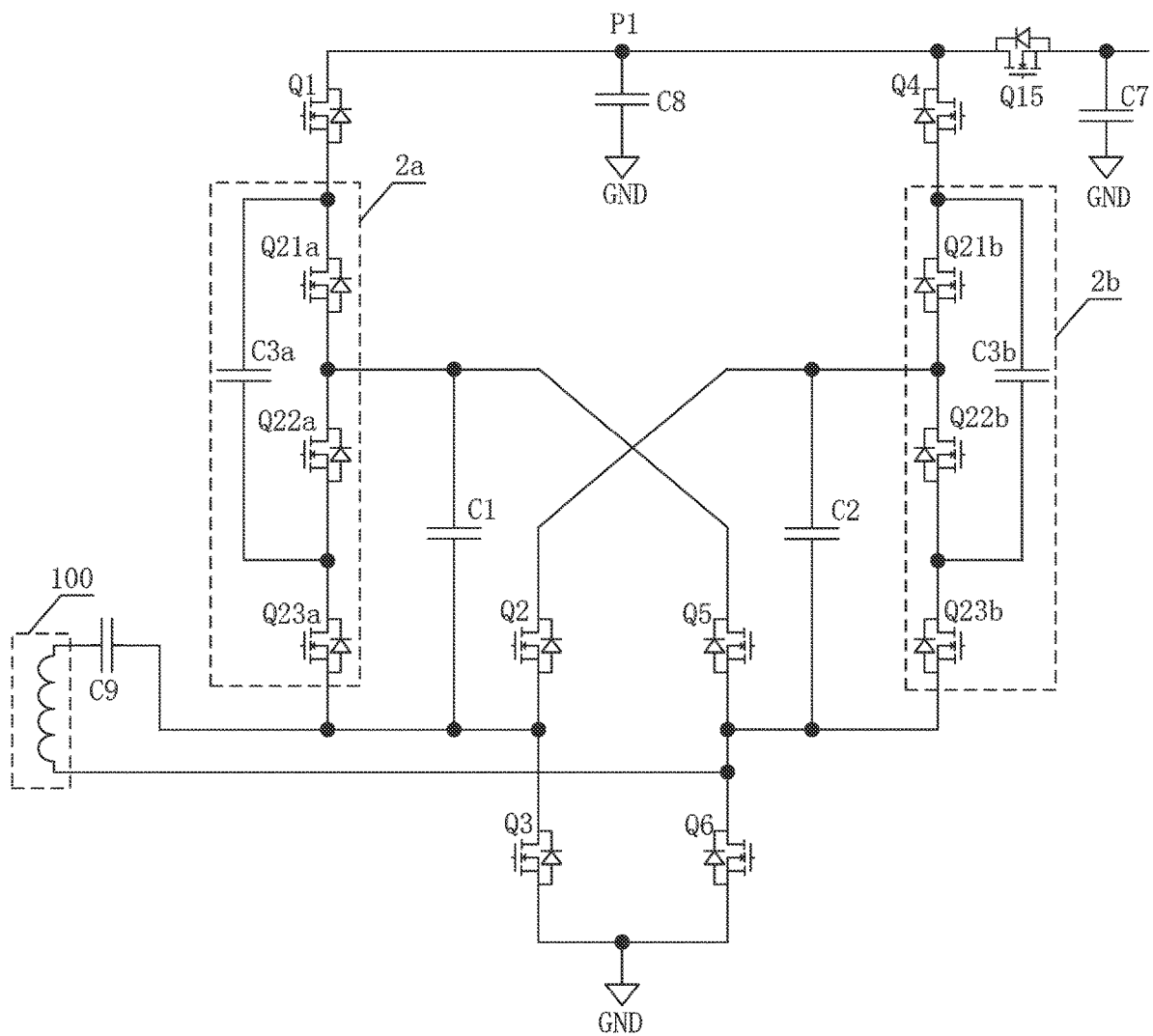
FIG. 6 is a schematic diagram of a circuit structure of a wireless charging receiving circuit provided by an embodiment of the present invention to implement a 1:3 voltage boost mode.

In one embodiment, referring to FIG. 6 in conjunction with FIG. 5, the two type-I expansion units are the type-I expansion unit 2*a* and the type-I expansion unit 2*b*. The drain of the first expansion switch Q21*a* of the type-I expansion unit 2*a* is connected to the source of the first switch Q1, and the source of the first expansion switch Q21*a* of the type-I expansion unit 2a is connected to the second terminal of the first capacitor C1. The source of the third expansion switch Q23a of the type-I expansion unit 2a is connected to the first terminal of the coil 100.

The drain of the first expansion switch Q21b of the type-I expansion unit 2b is connected to the source of the fourth switch Q4, and the source of the first expansion switch Q21b of the type-I expansion unit 2b is connected to the first terminal of the second capacitor C2. The source of the third expansion switch Q23 of the type-I expansion unit 2b is connected to the second terminal of the coil 100.

Specifically, when the alternating current signal on the coil 100 is in the positive half cycle, the control unit 90 controls the first switch Q1, the second switch Q2, the sixth switch Q6, and the second expansion switch Q22a of the type-I expansion unit 2a, and the first expansion switch Q21b and the third expansion switch Q23b of the type-I expansion unit 2b to be turned on, and control the other switches to be turned off. At this time, a portion of the alternating current signal on the coil 100 discharges the first capacitor C1 and the third capacitor C3a of the type-I expansion unit 2a, and charges the filter capacitor C8 through the first switch Q1, the sixth switch Q6 and the second expansion switch Q22a of the type-I expansion unit 2a. The other portion of the alternating current signal on the coil 100 charges the second capacitor C2 and the third capacitor C3b of the type-I expansion unit 2b through the second switch Q2, the first expansion switch Q21b and the third expansion switch Q23b of the type-I expansion unit 2b. In addition, the first switch Q1, the second switch Q2, the sixth switch Q6, the second expansion switch Q22a of the type-I expansion unit 2a, the first expansion switch Q21b and the third expansion switch Q23b of the type-I expansion unit 2b are turned off when the alternating current signal of the coil 100 reaches zero, to reduce switching losses.

When the alternating current signal on the coil 100 is in the negative half cycle, the control unit 90 controls the third switch Q3, the fourth switch Q4, the fifth switch Q5, the first expansion switch Q21a and the third expansion switches Q23a of the type-I expansion unit 2a, and the second expansion switch Q22b of the type-I expansion unit 2b to be turned on, and controls the other switches to be turned off. At this time, a portion of the alternating current signal on the coil 100 discharges the second capacitor C2 and the third capacitor C3b of the type-I expansion unit 2b, and charges the filter capacitor C8 through the third switch Q3, the fourth switch Q4, and the second expansion switch Q22b of the type-I expansion unit 2b. The other portion of the alternating current signal on the coil 100 charges the first capacitor C1 and the third capacitor C3a of the type-I expansion unit 2a through the fifth switch Q5, the first expansion switch Q21b and the third expansion switch Q23b of the type-I expansion unit 2b. In addition, the third switch Q3, the fourth switch Q4, the fifth switch Q5, the first expansion switch Q21a and the third expansion switch Q23a of the type-I expansion unit 2a and the second expansion switch Q22b of the type-I expansion unit 2b are turned off when the alternating current signal of the coil 100 reaches zero, to reduce switching losses.

By repeatedly performing the above two processes, it can be seen that when the third switch Q3, the first expansion switch Q21a and the third expansion switch Q23a of the type-I expansion unit 2a are all turned on, the first capacitor C1 and the third capacitor C3a of the type-I expansion unit 2a are connected in parallel. At this time, the DC voltage on the first capacitor C1 and the third capacitor C3a of the type-I expansion unit 2a is close to the effective value of the voltage across the coil 100. When the sixth switch Q6, the first expansion switch Q21b and the third expansion switch Q23b of the type-I expansion unit 2b are all turned on, the second capacitor C2 is connected in parallel with the third capacitor C3b of the type-I expansion unit 2b, at this time the DC voltage on the second capacitor C2 and the third capacitor C3b of the type-I expansion unit 2b is close to the effective value of the voltage across the coil 100.

In addition, when the first switch Q1, the second switch Q2, the sixth switch Q6, and the second expansion switch Q22a of the type-I expansion unit 2a are turned on, the first capacitor C1, the third capacitor C3a of the type-I expansion unit 2a and the third capacitor C3b of the type-I expansion unit 2b are connected in series, and the second terminal of the third capacitor C3b of the type-I expansion unit 2b is grounded. Therefore, the voltage across the filter capacitor C8 is close to three times of the effective value of the voltage across the coil 100.

Similarly, when the third switch Q3, the fourth switch Q4, the fifth switch Q5 and the second expansion switch Q22b of the type-I expansion unit 2b are turned on, the second capacitor C2, the third capacitor C3a of the type-I expansion unit 2a and the third capacitor C3b of the type-I expansion unit 2b are connected in series, and the second terminal of the third capacitor C3a of the type-I expansion unit 2a is grounded. Therefore, the voltage across the filter capacitor C8 is close to three times of the effective value of the voltage across the coil 100.

It can be understood that, in the above-mentioned operating state, the switching frequency of the charge pump and the working frequency of the wireless charging transmitter are synchronized.

Figure 7:
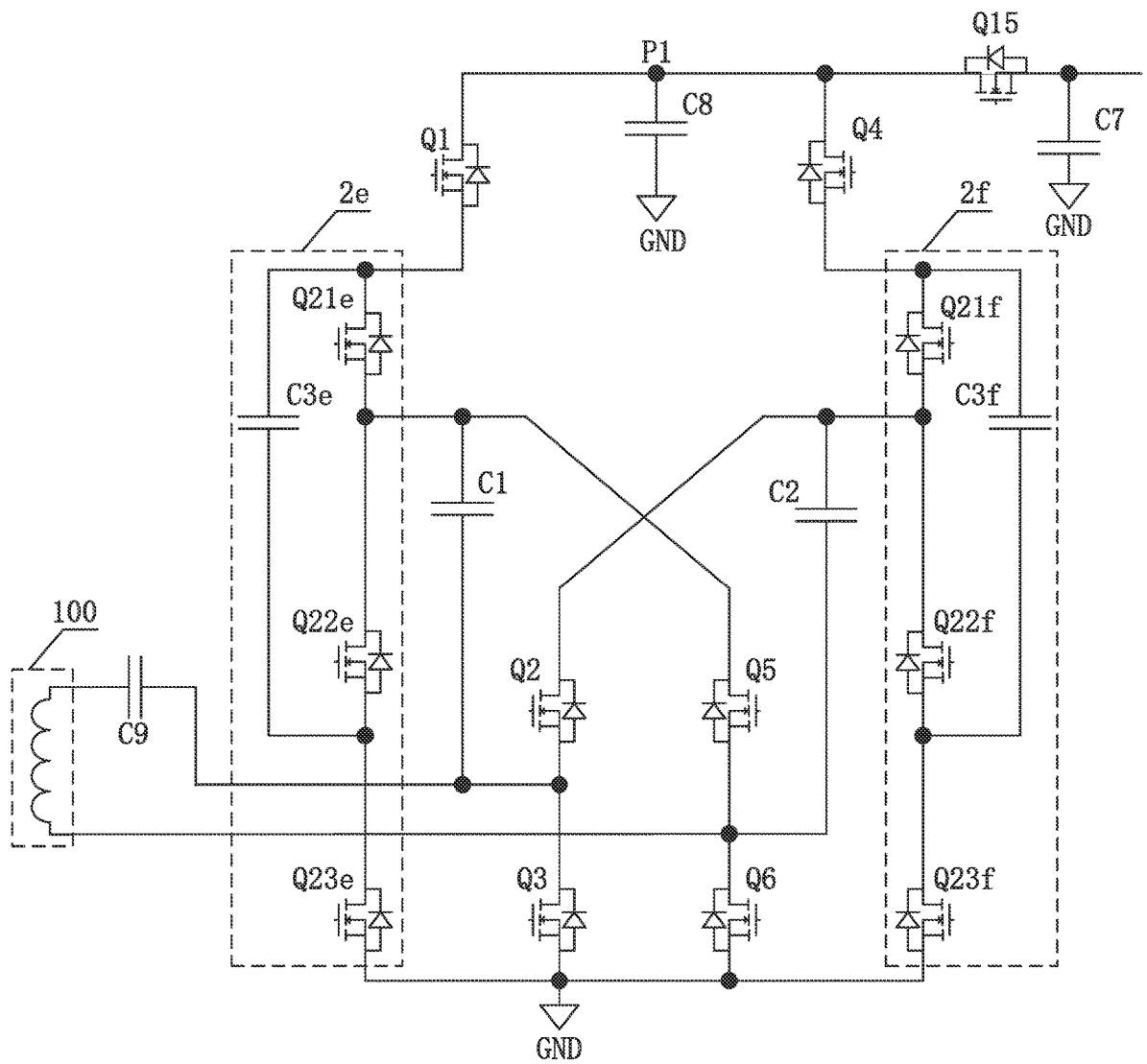
FIG. 7 is a schematic diagram of another circuit structure of a wireless charging receiving circuit provided by an embodiment of the present invention to realize a 1:3 voltage boost mode.

In another embodiment, as shown in FIG. 7, FIG. 7 shows the addition of two type-I expansion units to realize another connection method in which the ratio of the effective value of the amplitude of the AC voltage signal across the coil 100 to the voltage at the first connection node P1 is converted to 1:3. The two type-I expansion units are the type-I expansion unit 2e and the type-I expansion unit 2f.

Specifically, the drain of the first expansion switch Q21e of the type-I expansion unit 2e is connected to the source of the first switch Q1, and the source of the first expansion switch Q21e of the type-I expansion unit 2e is connected to the second terminal of the first capacitor C1. The source of the third expansion switch Q23e of the type-I expansion unit 2e is grounded. The drain of the first expansion switch Q21f of the type-I expansion unit 2f is connected to the source of the fourth switch Q4. The source of the first expansion switch Q21f of the type-I expansion unit 2f is connected to the first terminal of the second capacitor C2. The source of the third expansion switch Q23f of the type-I expansion unit 2f is grounded.

When the alternating current signal on the coil 100 is in the positive half cycle, the control unit 90 controls the second switch Q2, the fourth switch Q4, the sixth switch Q6, the first expansion switch Q21e and the third expansion switch Q23e of the type-I expansion unit 2e, and the second expansion switch Q22f of the type-I expansion unit 2f to be turned on, and controls the other switches to be turned off at the same time.

At this time, a portion of the alternating current signal on the coil 100 discharges the first capacitor C1 and charges the third capacitor C3e of the type-I expansion unit 2e through the sixth switch Q6, the first expansion switch Q21e and the third expansion switch Q23e of the type-I expansion unit 2e. The voltage across the first capacitor C1 and the second capacitor C2 is close to the effective value of the voltage across the coil 100. The third capacitor C3e of the type-I expansion unit 2e is charged by the first capacitor C1 and the second capacitor C2 connected in series. The voltage across the third capacitor C3e of the type-I expansion unit 2e is close to twice of the effective value of the voltage across the coil 100.

At the same time, the other portion of the alternating current signal on the coil 100 charges the second capacitor C2 through the second switch Q2, the fourth switch Q4, and the second expansion switch Q22f of the type-I expansion unit 2f, and charges the filter capacitor C8 through the third capacitor C3f of the type-I expansion unit 2f. Since the third capacitor C3f of the type-I expansion unit 2f has been the same as the third capacitor C3e of the type-I expansion unit 2e in the previous cycle, a voltage close to twice of the effective value of the voltage across the coil 100 has been accumulated across both terminals. Therefore, the third capacitor C3f of the type-I expansion unit 2f is connected in series with the second capacitor C2 to obtain a voltage close to three times of the effective value of the voltage across the coil 100, that is, the voltage across the filter capacitor C8 is close to three times of the effective value of the voltage across the coil 100. In addition, the second switch Q2, the fourth switch Q4, the sixth switch Q6, the first expansion switch Q21e, the third expansion switch Q23e of the type-I expansion unit 2e and the second expansion switch Q22f of the type-I expansion unit 2f are turned off when the alternating current signal of the coil 100 reaches zero, to reduce switching losses.

When the alternating current signal on the coil 100 is in the negative half cycle, the control unit 90 controls the first switch Q1, the third switch Q3, the fifth switch Q5, the second expansion switch Q22e of the type-I expansion unit 2e, the first expansion switch Q21f and the third expansion switch Q23f of the type-I expansion unit 2f to be turned on, and control the remaining switches to be turned off at the same time.

At this time, a portion of the alternating current signal on the coil 100 charges the first capacitor C1 through the first switch Q1, the fifth switch Q5, and the second expansion switch Q22e of the type-I expansion unit 2e, and discharges the third capacitor C3e of the extension unit 2e to charge the filter capacitor C8. Therefore, the voltage across the filter capacitor C8 is close to three times of the effective value of the voltage across the coil 100.

At the same time, the other portion of the alternating current signal on the coil 100 discharges the second capacitor C2 through the third switch Q3, the first expansion switch Q21f and the third expansion switch Q23f of the type-I expansion unit 2f to charge the third capacitor C3f of the type-I expansion unit 2f. Therefore, the voltage across the second capacitor C2 is close to the effective value of the voltage across the coil 100, and the voltage across the third capacitor C3f of the type-I expansion unit 2f is close to twice of the effective value of the voltage on the coil 100. Moreover, the first switch Q1, the third switch Q3, the fifth switch Q5, the second expansion switch Q22e of the type-I expansion unit 2e, and the first expansion switch Q21f and the third expansion switch Q23f of the type-I expansion unit 2f are controlled to be turned off when the alternating current signal of the coil 100 reaches zero to reduce switching losses.

By repeatedly performing the above two processes, the ratio of the effective value of the amplitude of the AC voltage signal on the coil 100 to the voltage at the first connection node P1 can be converted to 1:3.

Continue referring to FIG. 7, it can be seen that the switch combination of the fifth switch Q5 and sixth switch Q6, and the switch combination of the second expansion switch Q22e and the third expansion switch Q23e of the type-I expansion unit 2e are connected in parallel between the second terminal of the first capacitor C1 and ground. Furthermore, the fifth switch Q5 and the second expansion switch Q22e of the type-I expansion unit 2e are controlled to be turned on and off at the same time. The sixth switch Q6 and the third expansion switch Q23e of the type-I expansion unit 2e are also controlled to be turned on and off at the same time. As a result, the two switch combinations can be merged into one as shown in FIG. 7B. As can be seen, after the merger, the second terminal of the third capacitor C3e of the type-I expansion unit 2e is directly connected to the second terminal of the coil 100. Similarly, the second terminal of the third capacitor C3e of the type-I expansion unit 2e is directly connected to the second terminal of the coil 100.

Similar to the circuit shown in FIG. 7, the first group of switches (comprising the second switch Q2, the fourth switch Q4, the sixth switch Q6 and the first expansion switch Q21e of the type-I expansion unit 2e), and the second group of switches (comprising the first switch Q1, the third switch Q3, the fifth switch Q5 and the first expansion switch Q21f of the type-I expansion unit 20 can be controlled to alternatively turn on in sync with the alternating current on the coil 100 to achieve a ratio of 1:3 between the effective value of the amplitude of the AC voltage signal on the coil 100 to the voltage at the first connection node P1.

Figure 7A:
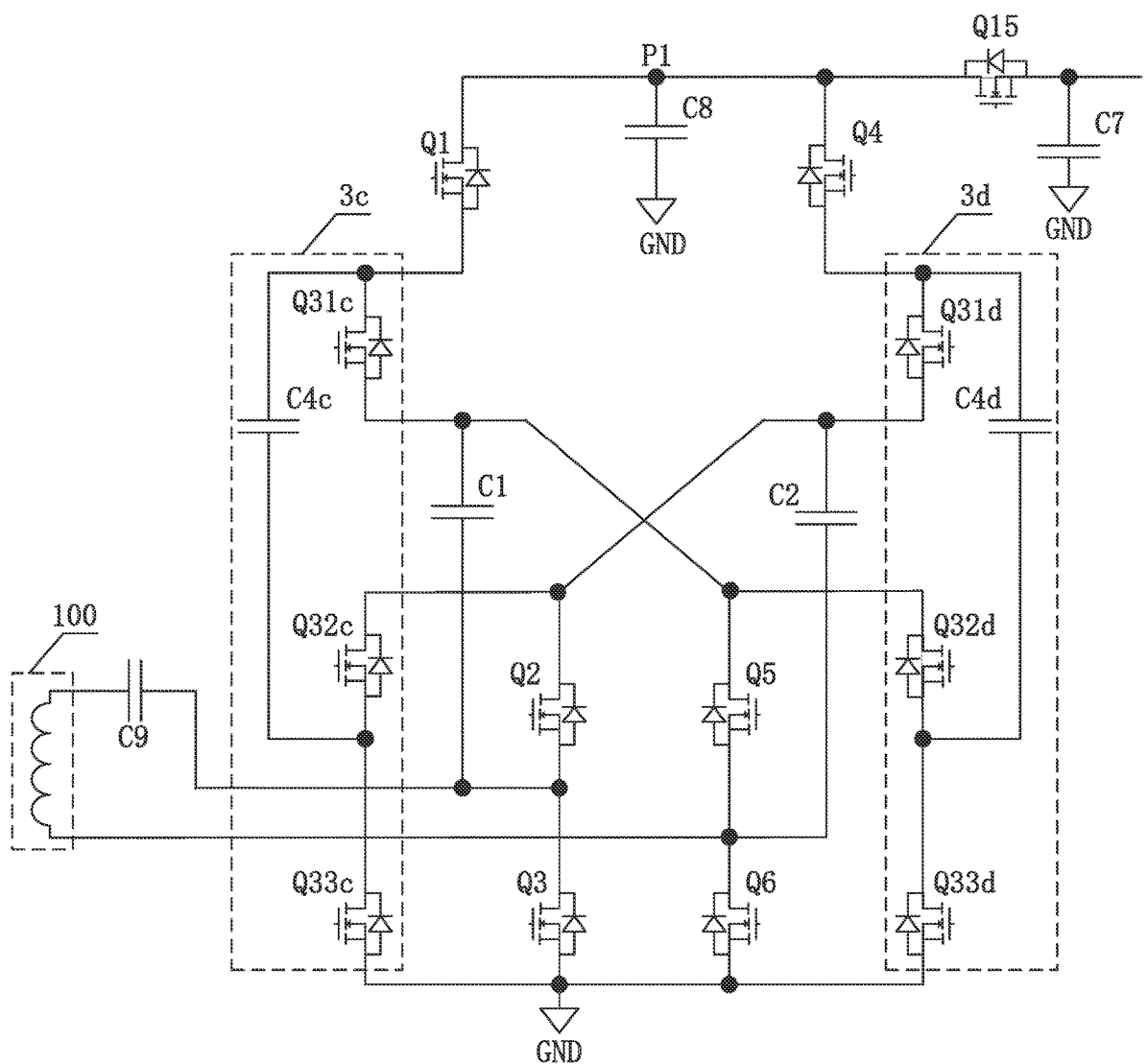
Figure 7B:
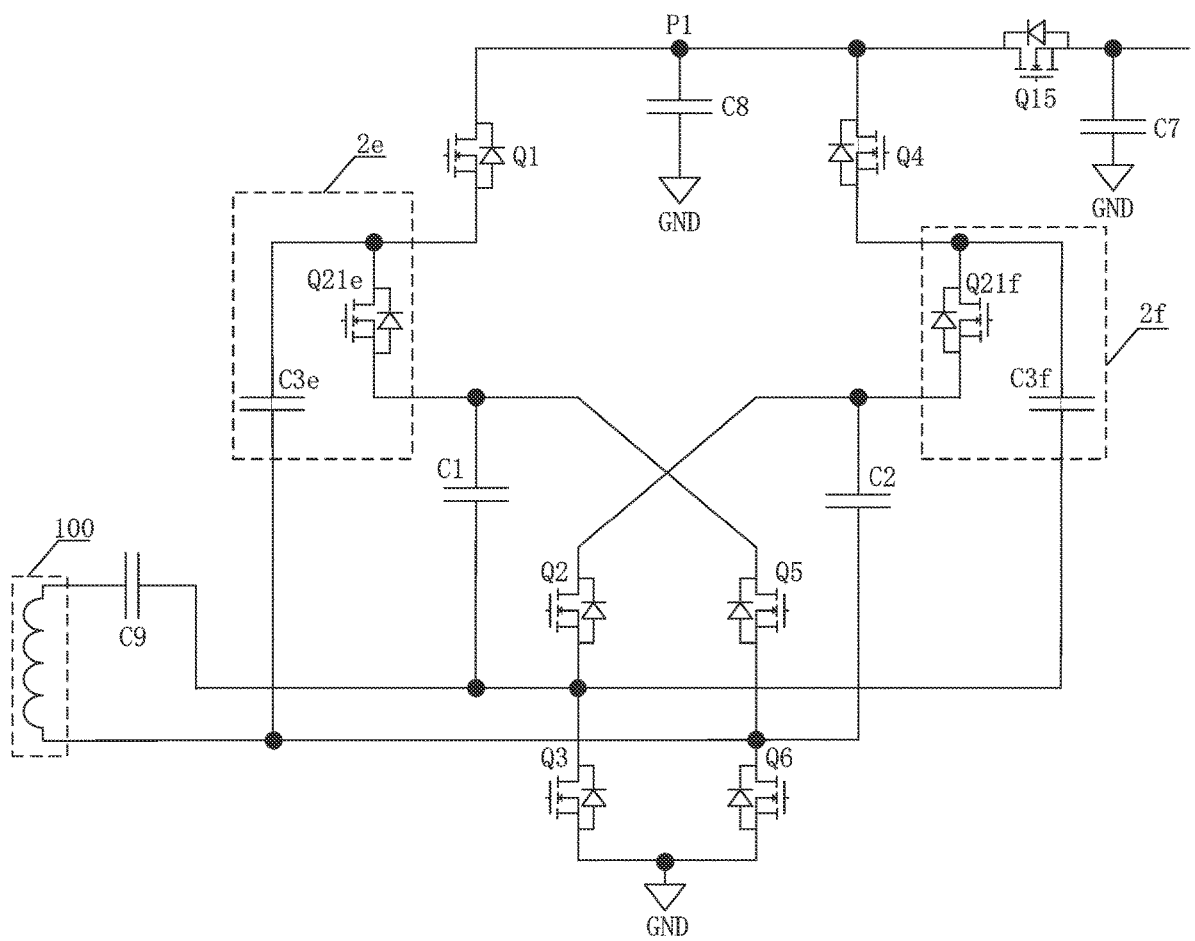
Figure 8:
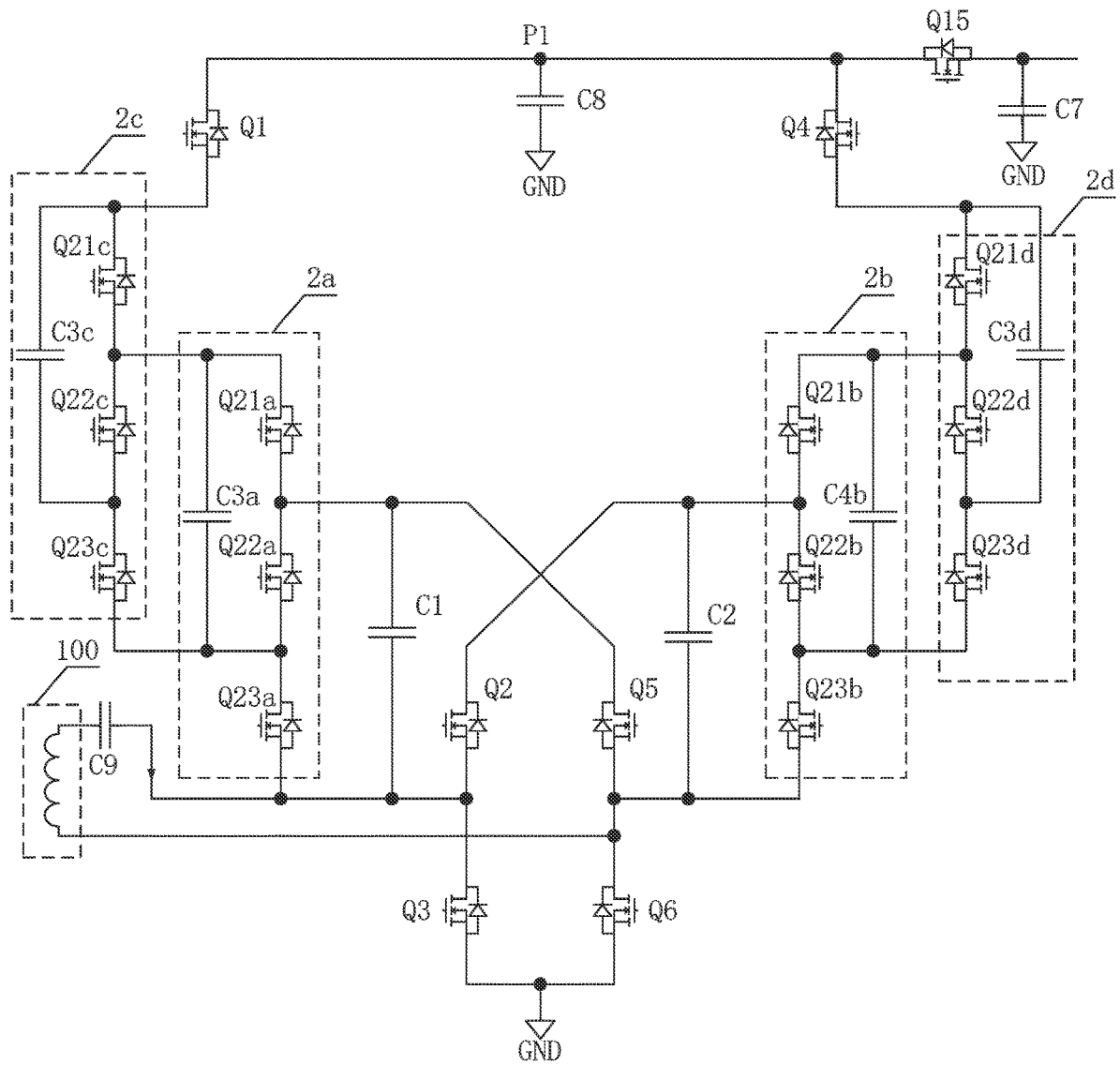
FIG. 8 is a schematic diagram of a circuit structure of a wireless charging receiving circuit provided by an embodiment of the present invention to implement a 1:4 voltage boost mode.

Comparing with the circuit in FIG. 7, the simplified circuit shown in FIG. 7B reduces the number of switches and the driving circuit associated with them to improve the power conversion efficiency and reduce the circuit size. This technique can be applied to expanding the circuit to achieve a higher voltage conversion ratio. Of course, the circuit structures shown in FIG. 6 or FIG. 7 can also be expanded in the same way to achieve a higher ratio. For example, adding two type-I expansion units to the circuit structure shown in FIG. 6 to obtain the circuit shown in FIG. 8. Now the ratio of the effective value of the amplitude of the AC voltage signal on the coil 100 to the voltage at the first connection node P1 is 1:4.

The drain of the first expansion switch Q21c of the type-I expansion unit 2c is connected to the source of the first switch Q1, and the source of the first expansion switch Q21c of the type-I expansion unit 2c is connected to the first terminal of the third capacitor C3a of the type-I expansion unit 2a. The source of the third expansion switch Q23c of the type-I expansion unit 2c is connected to the second terminal of the third capacitor C3a of the type-I expansion unit 2a. The drain of the first expansion switch Q21d of the type-I expansion unit 2d is connected to the source of the fourth switch Q4, and the source of the first expansion switch Q21d of the type-I expansion unit 2d is connected to the first terminal of the third capacitor C3b of the type-I expansion unit 2b. The source of the third expansion switch Q23d of the type-I expansion unit 2d is connected to the second terminal of the third capacitor C3b of the type-I expansion unit 2b.

Specifically, when the alternating current signal on the coil 100 is in the positive half cycle, the first switch Q1, the second switch Q2, the sixth switch Q6, the second expansion switch Q22a of the type-I expansion unit 2a, the first expansion switch Q21b and the third expansion switch Q23b of the type-I expansion unit 2b, the second expansion switch Q22c of the type-I expansion unit 2c, and the first expansion switch Q21d and the third expansion switch Q23b of the type-I expansion unit 2d are turned on, while the rest of the switches are turned off.

When the alternating current signal on the coil 100 is in the negative half cycle, the third switch Q3, the fourth switch Q4, the fifth switch Q5, the first expansion switch Q21a and the third expansion switch Q23a of the type-I expansion unit 2a, the second expansion switch Q22b of the type-I expansion unit 2b, the first expansion switch Q21c and the third expansion switch Q23c of the type-I expansion unit 2c, and the second expansion switch Q22d of the type-I expansion unit 2d are turned on, and the rest of the switches are turned off at the same time.

Optionally, the wireless charging receiving circuit further includes two type-II expansion units. The two type-II expansion units are used to convert the ratio of the effective value of the amplitude of the AC voltage signal across the coil 100 to the voltage at the first connection node P1 to 1:4.

As shown in FIG. 5, the type-II expansion unit 3 includes a fourth capacitor C4, a fourth expansion switch Q31, a fifth expansion switch Q32, and a sixth expansion switch Q33. The first terminal of the fourth capacitor C4 and the drain of the fourth expansion switch Q31 are connected, and the second terminal of the fourth capacitor C4 is connected to the source of the fifth expansion switch Q32 and the drain of the sixth expansion switch Q33.

In one embodiment, referring to FIG. 7A in conjunction with FIG. 5, the two type-II expansion units are the type-II expansion unit 3c and the type-II expansion unit 3d. The drain of the fourth expansion switch Q31c of the type-II expansion unit 3c is connected to the source of the first switch Q1. The source of the fourth expansion switch Q31c of the type-II expansion unit 3c is connected to the second terminal of the first capacitor C1. The drain of the fifth expansion switch Q32c of the type-II expansion unit 3c is connected to the drain of the second switch Q2. The source of the third expansion switch Q33c of the type-II expansion unit 3c is connected to ground.

The drain of the fourth expansion switch Q31d of the type-II expansion unit 3d is connected to the source of the fourth switch Q4. The source of the fourth expansion switch Q31d of the type-II expansion unit 3d is connected to the first terminal of the second capacitor C2. The drain of the fifth expansion switch Q32d of the type-II expansion unit 3d is connected to the drain of the fifth switch Q5. The source of the sixth expansion switch Q33d of the type-II expansion unit 3d is connected to ground.

Specifically, when the alternating current signal on the coil 100 is in the positive half cycle, the control unit 90 controls the second switch Q2, the fourth switch Q4, the sixth switch Q6, and the fourth expansion switch Q31c, the sixth expansion switch Q33c of the type-II expansion unit 3c, and the fifth expansion switch Q32d of the type-II expansion unit 3d to be turned on, and controls the other switches to be turned off. At this time, a portion of the alternating current signal on the coil 100 discharges the first capacitor C1 and the fourth capacitor C4d of the type-II expansion unit 3d, and charges the filter capacitor C8 through the second switch Q2, the fourth switch Q4 and the fifth expansion switch Q32d of the type-II expansion unit 3d. The other portion of the alternating current signal on the coil 100 charges the fourth capacitor C4c of the type-II expansion unit 3c through the fourth expansion switch Q31c of the type-II expansion unit 3c. The other portion of the alternating current signal on the coil 100 charges the second capacitor C2 through the second switch Q2. In addition, the second switch Q2, the fourth switch Q4, the sixth switch Q6, the fourth expansion switch Q31c and the sixth expansion switch Q33c of the type-II expansion unit 3c, and the fifth expansion switch Q32d of the type-II expansion unit 3d are turned off when the alternating current signal of the coil 100 reaches zero, to reduce switching losses.

When the alternating current signal on the coil 100 is in the negative half cycle, the control unit 90 controls the first switch Q1, the third switch Q3, the fifth switch Q5, the fifth expansion switch Q32c of the type-II expansion unit 3c, the fourth expansion switch Q31d and the sixth expansion switches Q33d of the type-II expansion unit 3d to be turned on, and control the other switches to be turned off. At this time, a portion of the alternating current signal on the coil 100 discharges the second capacitor C2 and the fourth capacitor C4c of the type-II expansion unit 3c, and charges the filter capacitor C8 through the first switch Q1, third switch Q3, the fifth expansion switch Q32c of the type-II expansion unit 3c. Another portion of the alternating current signal on the coil 100 charges the first capacitor C1 through the fifth switch Q5 and the third switch Q3. Yet another part of the alternating current signal on the coil 100 charges the fourth capacitor C4d of the type-II expansion unit 3d through the second capacitor C2, the fourth expansion switch Q31d and the sixth expansion switch Q33d of the type-II expansion unit 3d. In addition, the first switch Q1, third switch Q3, the fifth switch Q5, the fourth expansion switch Q31d and the sixth expansion switch Q33d of the type-II expansion unit 3d and the fifth expansion switch Q32c of the type-II expansion unit 3c are turned off when the alternating current signal of the coil 100 reaches zero, to reduce switching losses.

By repeatedly performing the above two processes, it can be seen that when the alternating current signal on the coil 100 is in the positive half cycle, the second capacitor C2 is charged through the second switch Q2 and the sixth switch Q6 to the effective value of the voltage across the coil 100. Next, when the alternating current signal on the coil 100 is in the negative half cycle, the fourth expansion capacitor C4d of the type-II expansion unit 3d is charged by the coil current through the second capacitor C2 to twice the effective value of the voltage across the coil 100 through the third switch Q3, the fourth expansion switch Q31d and sixth expansion switch Q33d of the type-II expansion unit 3d. At the same time, the first capacitor C1 is charged through the third switch Q3 and the fifth switch Q5 to the effective value of the voltage across the coil 100. When the alternating current signal on the coil 100 is in the positive half cycle again, the sixth switch Q6, the fifth expansion switch Q32d of the type-II expansion unit 3d and the fourth switch Q4 are turned on. The first capacitor C1 and the fourth expansion capacitor C4d of the type-II expansion unit 3d are connected in series. At this time, the DC voltage on the first capacitor C1 is close to the effective value of the voltage across the coil 100 and the DC voltage on the fourth capacitor C4d of the type-II expansion unit 3d is twice the effective value of the voltage across the coil 100. Therefore, when the alternating current signal on the coil 100 charges the output capacitor C8 through C1 and C4d, the voltage across the filter capacitor C8 is close to four times of the effective value of the voltage across the coil 100. At the same time, the fourth capacitor C4c of the type-II expansion unit 3c is charged by the coil current through the first capacitor C1 to twice the effective value of the voltage across the coil 100 through the sixth switch Q6, the fourth expansion switch Q31c and sixth expansion switch Q33c of the type-II expansion unit 3c. When the alternating current signal on the coil 100 is in the negative half cycle again, the third switch Q3, the fifth expansion switch Q32c of the type-II expansion unit 3c and the first switch Q1 are turned on. The second capacitor C2 and the fourth expansion capacitor C4c of the type-II expansion unit 3c are connected in series. At this time, the DC voltage on the second capacitor C2 is close to the effective value of the voltage across the coil 100 and the DC voltage on the fourth capacitor C4c of the type-II expansion unit 3c is twice the effective value of the voltage across the coil 100. Therefore, when the alternating current signal on the coil 100 charges the output capacitor C8 through C2 and C4c, the voltage across the filter capacitor C8 is close to four times of the effective value of the voltage across the coil 100.

Therefore, in either the positive half cycle or the negative half cycle of the coil current, the voltage across the filter capacitor C8 is being charged to a level close to four times of the effective value of the voltage across the coil 100, to achieve a 1:4 boost conversion ratio.

It can be understood that, in the above-mentioned working state, the switching frequency of the charge pump and the working frequency of the wireless charging transmitter are synchronized. For the circuit structure shown in FIG. 7, if it is necessary to convert the ratio of the effective value of the amplitude of the AC voltage signal across the coil 100 to the voltage at the first connection node P1 to 1:N, where N is a positive integer greater than 4, more type-II expansion units 3 in FIG. 5 can be cascaded according to requirements.

The ratio of the effective value of the amplitude of the AC voltage signal on the coil 100 to the voltage at the first connection node P1 being converted to 1:5 is taken as an example. The wireless charging receiving circuit further includes two type-II expansion units, that is, the wireless charging receiving circuit at this time includes two type-I expansion units and two type-II expansion units.

As shown in FIG. 5, the type-II expansion unit 3 includes a fourth capacitor C4, a fourth expansion switch Q31, a fifth expansion switch Q32, and a sixth expansion switch Q33. The first terminal of the fourth capacitor C4 and the drain of the fourth expansion switch Q31 are connected, and the second terminal of the fourth capacitor C4 is connected to the source of the fifth expansion switch Q32 and the drain of the sixth expansion switch Q33.

Figure 9:
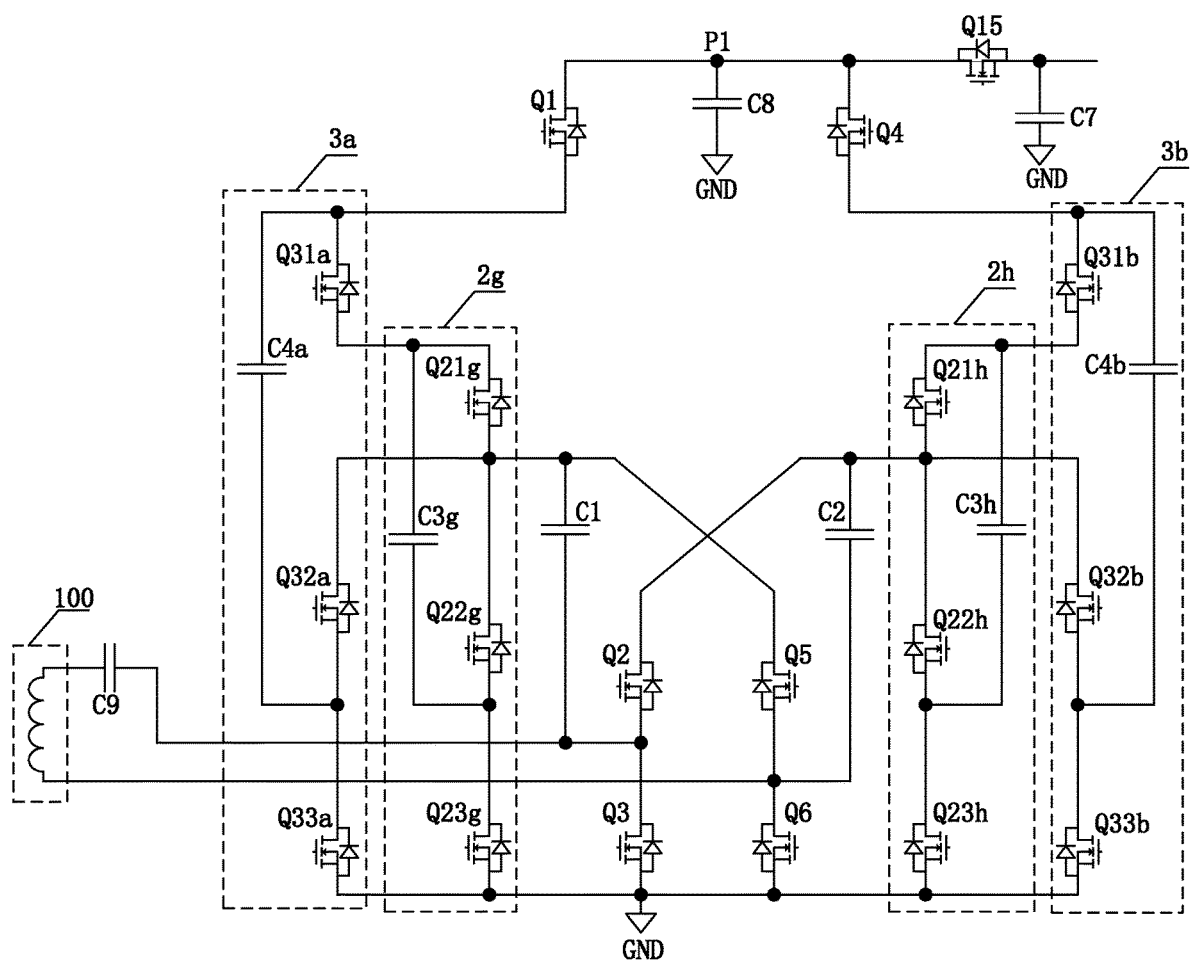
FIG. 9 is a schematic diagram of a circuit structure of a wireless charging receiving circuit provided by an embodiment of the present invention to implement a 1:5 voltage boost mode.

Please refer to FIG. 9 in conjunction with FIG. 5, the two type-I expansion units are the type-I expansion unit 2g and the type-I expansion unit 2h. The two type-II expansion units are the type-II expansion unit 3a and the type-II expansion unit 3b.

The drain of the fourth expansion switch Q31a of the type-II expansion unit 3a is connected to the source of the first switch Q1. The source of the fourth expansion switch Q31a of the type-II expansion unit 3a is connected to the first terminal of the third capacitor C3g of the type-I expansion unit 2g. The drain of the fifth expansion switch Q32a of the type-II expansion unit 3a is connected to the second terminal of the first capacitor C1. The source of the sixth expansion switch Q33a of the type-II expansion unit 3a is grounded. The drain of the fourth expansion switch Q31b of the type-II expansion unit 3b is connected to the source of the fourth switch Q4. The source of the fourth expansion switch Q31b of the type-II expansion unit 3b is connected to the first terminal of the third capacitor C3h of the type-I expansion unit 2h. The drain of the fifth expansion switch Q32b of the type-II expansion unit 3b is connected to the first terminal of the second capacitor C2, and the source of the sixth expansion switch Q33b of the type-II expansion unit 3b is grounded.

Specifically, when the alternating current signal on the coil 100 is in the positive half cycle, the control unit 90 controls the first switch Q1, the second switch Q2, the sixth switch Q6, the first expansion switch Q21g, the third expansion switch Q23g of the type-I expansion unit 2g, the second expansion switch Q22h of the type-I expansion unit 2h, the fifth expansion switch Q32a of the type-II expansion unit 3a, the fourth expansion switch Q31b and the sixth expansion switch Q33b of the type-II expansion unit 3b to be turned on, and controls the other switches to be turned off at the same time.

When the alternating current signal on the coil 100 is in the negative half cycle, the control unit 90 controls the third switch Q3, the fourth switch Q4, the fifth switch Q5, the second expansion switch Q22g of the type-I expansion unit 2g, the first expansion switch Q21h and the third expansion switch Q23h of the type-I expansion unit 2h, the fourth expansion switch Q31a and the sixth expansion switch Q33a of the type-II expansion unit 3a, and the fifth expansion switch Q32b of the type-II expansion unit 3b to be turned on, while controlling the rest of the switches to be turned off.

For the circuit structure shown in FIG. 9, if it is necessary to convert the ratio of the effective value of the amplitude of the AC voltage signal across the coil 100 to the voltage at the first connection node P1 to 1:M, where M is 5, 8, 13 . . . . Then, more type-II expansion units 3 in FIG. 5 can be cascaded in a similar manner according to requirements.

Figure 10:
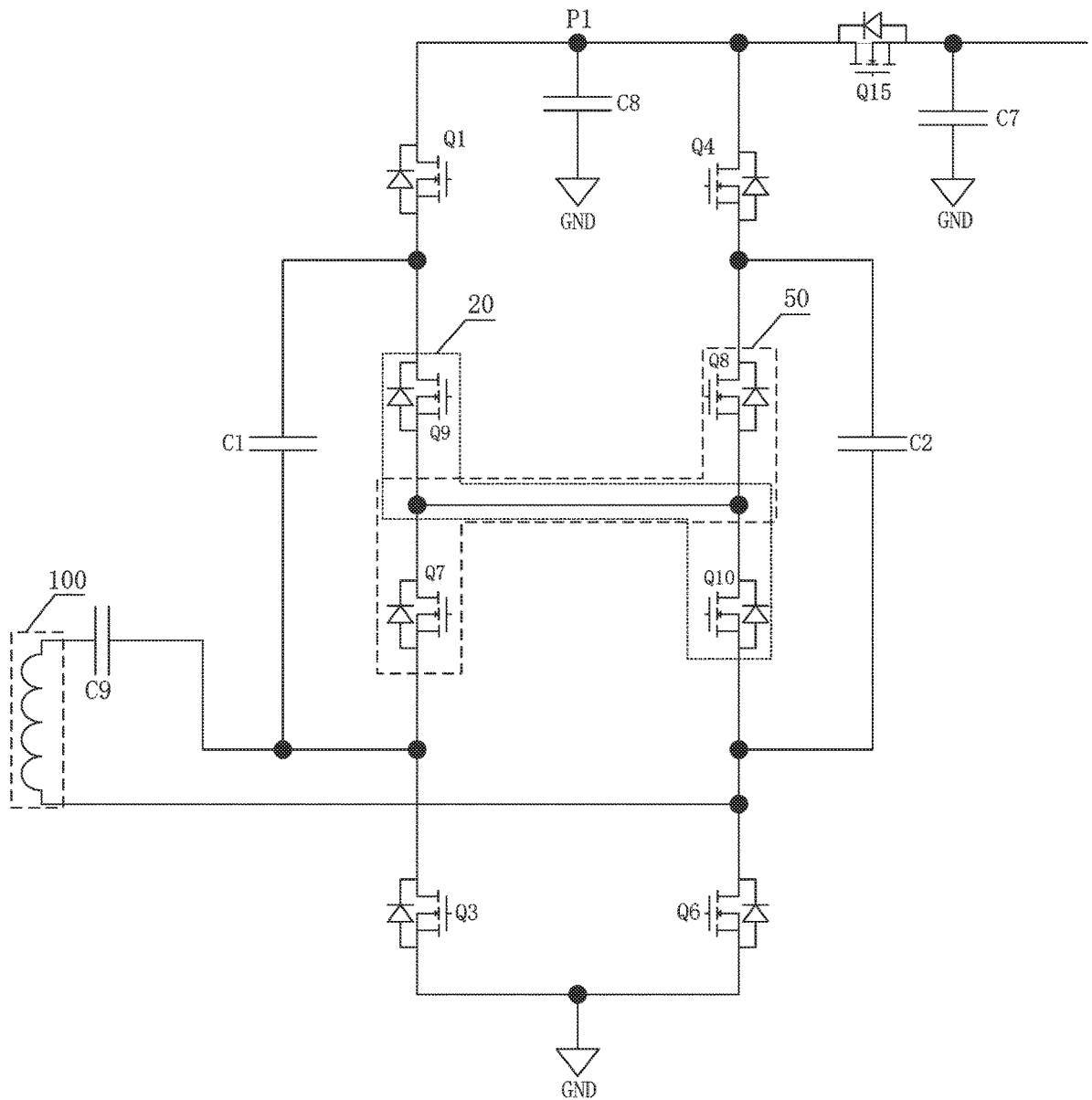
FIG. 10 is a schematic diagram of another circuit structure of a wireless charging receiving circuit provided by an embodiment of the present invention to implement a 1:2 voltage boost mode.

In another embodiment, as shown in FIG. 10, the second switch unit 20 includes a seventh switch Q7 and a switch Q8, and the fifth switch unit 50 includes a ninth switch Q9 and a tenth switch Q10.

The source of the seventh switch Q7 is connected to the first terminal of the coil 100. The drain of the seventh switch Q7 is connected to the source of the eighth switch Q8, and the drain of the eighth switch Q8 is connected to the first terminal of the second capacitor C2. The drain of the ninth switch Q9 is connected to the second terminal of the first capacitor C1. The source of the ninth switch Q9 is connected to the drain of the tenth switch Q10, and the source of the tenth switch Q10 is connected to the second terminal of the coil 100. At the same time, the drain of the seventh switch Q7 is also connected to the source of the ninth switch Q9, and the source of the eighth switch Q8 is also connected to the drain of the tenth switch Q10. The connection node between the drain of the seventh switch Q7 and the source of the ninth switch Q9 is connected with the connection node between the source of the eighth switch Q8 and the drain of the tenth switch Q10.

Specifically, the third switch Q3, the sixth switch Q6, the seventh switch Q7 and the tenth switch Q10 form a full-wave synchronous rectifier, but different from the traditional full-wave synchronous rectifier. The drain terminals of the seventh switch Q7 and the tenth switch Q10 are not connected to the rectifying output capacitor, but the first capacitor C1 and the second capacitor C2 alternately function as the rectifying output capacitor.

When the coil 100 is used as the receiving coil of a wireless charging receiving circuit, that is, the voltage across the coil 100 is the input voltage, and the voltage at the first connection node P1 is the output voltage. At this time, the signal across the coil 100 is an alternating signal.

When the alternating current signal on the coil 100 is in the positive half cycle, the control unit 90 controls the first switch Q1, the sixth switch Q6, the seventh switch Q7 and the eighth switch Q8 to conduct, and at the same time controls the remaining switches to be turned off. At this time, a portion of the alternating current signal on the coil 100 discharges the first capacitor C1, and charges the filter capacitor C8 through the first switch Q1 and the sixth switch Q6. The other portion of the alternating current signal on the coil 100 charges the second capacitor C2 through the seventh switch Q7 and the eighth switch Q8. Because the second capacitor C2 was charged to a DC voltage close to the effective value of the voltage across the coil 100 in the previous cycle, the voltage across the filter capacitor C8 is equivalent to the superposition of the voltage across the first capacitor C1 and the second capacitor C2, that is, the voltage across the filter capacitor C8 is close to twice of the effective value of the voltage across the coil 100. In addition, the first switch Q1, the sixth switch Q6, the seventh switch Q7, and the eighth switch Q8 are controlled to be turned off when the alternating current signal of the coil 100 reaches zero, to reduce switching losses.

When the alternating current signal on the coil 100 is in the negative half cycle, the control unit 90 controls the third switch Q3, the fourth switch Q4, the ninth switch Q9 and the tenth switch Q10 to be turned on, while controlling the remaining switches to be turned off. At this time, a portion of the alternating current signal on the coil 100 discharges the second capacitor C2, and charges the filter capacitor C8 through the third switch Q3 and the fourth switch Q4. The other portion of the alternating current signal on the coil 100 charges the first capacitor C1 through the ninth switch Q9 and the tenth switch Q10. Similarly, it can be achieved that the voltage across the filter capacitor C8 is close to twice of the effective value of the voltage across the coil 100. In addition, the third switch Q3, the fourth switch Q4, the ninth switch Q9, and the tenth switch Q10 are controlled to be turned off when the alternating current signal of the coil 100 reaches zero, to reduce switching losses.

By repeating the above two processes in this way, it can be realized that the voltage output at the first connection node P1 is twice of the effective value of the voltage across the coil 100. In addition, the connection node between the drain of the seventh switch Q7 and the source of the ninth switch Q9, and the connection node between the source of the eighth switch Q8 and the drain of the tenth switch Q10 can be continuously monitored. The voltage at the connection node P1 can thus be adjusted by the output power of the wireless charging transmitter according to different output loads. The voltage at the connection node between the drain of the seventh switch Q7 and the source of the ninth switch Q9, and the voltage at the connection node between the source of the eighth switch Q8 and the drain of the tenth switch Q10 are lower than the output voltage at the first connection node P1, which is more convenient to monitor.

Conversely, when the voltage across the coil 100 is an AC output voltage and the voltage at the first connection node P1 is an input voltage, that is, the first connection node P1 serves as a DC input source, and the coil 100 serves as a wireless power transmitting coil 100.

At this time, the combination of the first switch Q1, the sixth switch Q6, the seventh switch Q7 and the eighth switch Q8, and the combination of the third switch Q3, the fourth switch Q4, the nine switch Q9 and the tenth switch Q10 are turned on alternately at a preset frequency.

Suppose that the combination of the first switch Q1, the sixth switch Q6, the seventh switch Q7, and the eighth switch Q8 is regarded as the third switch combination, and the combination of the third switch Q3, the fourth switch Q4, and the ninth switch Q9 and the tenth switch Q10 is regarded as the fourth switch combination.

When the third switch combination is turned on, the fourth switch combination is turned off. The filter capacitor C8 charges the first capacitor C1 and the second capacitor C2 in series through the first switch Q1, the sixth switch Q6, the seventh switch Q7, and the eighth switch Q8. The voltage across the first capacitor C1 and the second capacitor C2 is about half of the voltage across the filter capacitor C8. At the same time, the voltage between the two terminals of the coil 100 is the same as the voltage across the second capacitor C2. Then, when the fourth switch combination is turned on, the third switch combination is turned off, and the filter capacitor C8 charges the first capacitor C1 and the second capacitor C2 in series through the third switch Q3, the fourth switch Q4, the ninth switch Q9 and the tenth switch Q10. The voltage across the first capacitor C1 and the second capacitor C2 is about half of the voltage across the filter capacitor C8. At the same time, the voltage between the two terminals of the coil 100 is the same as the voltage across the second capacitor C2. Repeatedly in this way, the DC power input at the first connection node P1 is inverted, and an AC voltage with a half amplitude of the voltage at the first connection node P1 is formed on the coil 100. An AC current is formed on the coil 100.

Figure 11:
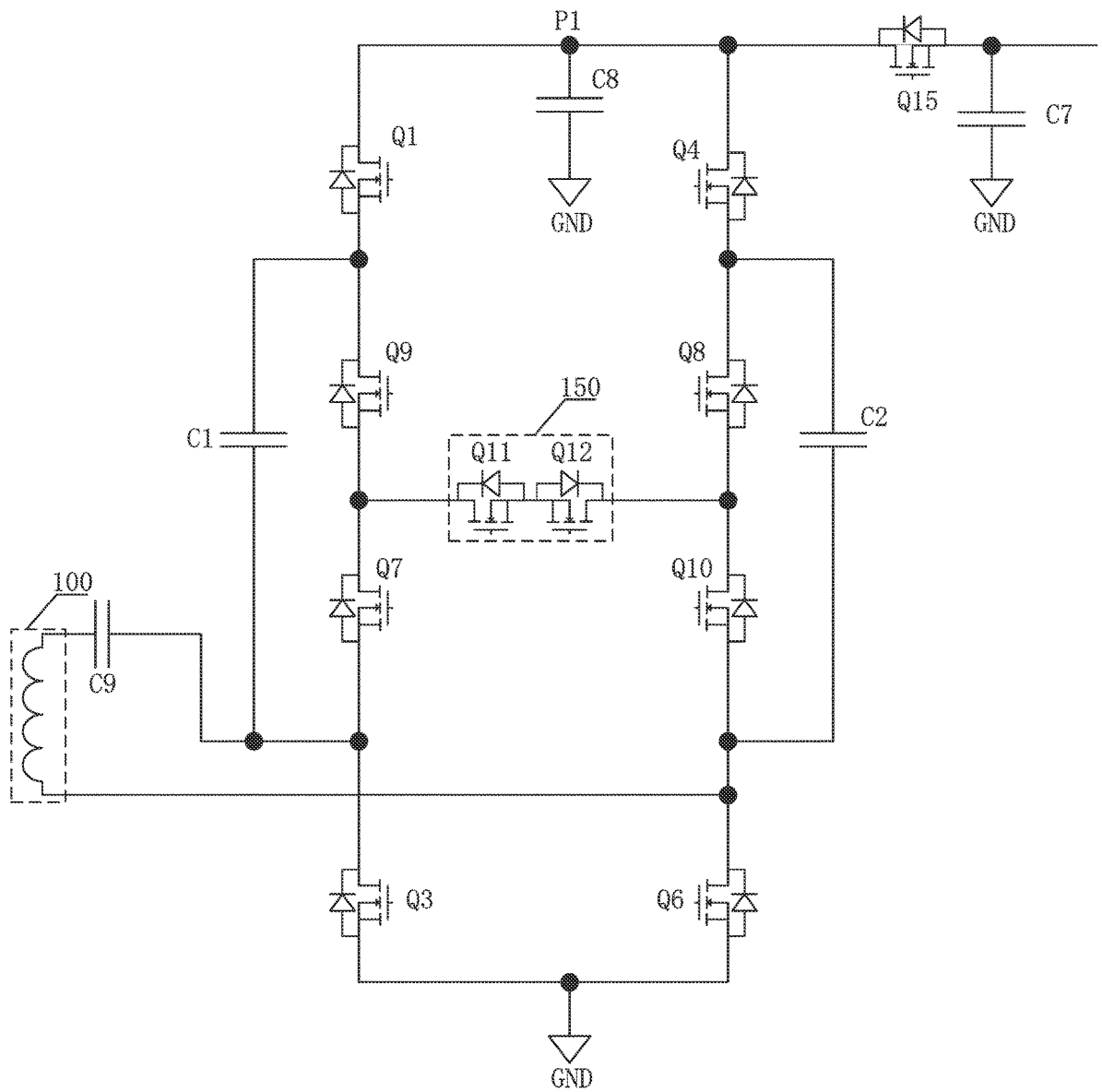
FIG. 11 is a schematic diagram of another circuit structure of a wireless charging receiving circuit provided by an embodiment of the present invention to realize a 1:1 pass-through mode.

In an embodiment, as shown in FIG. 11, the wireless charging receiving circuit further includes a seventh switch unit 150. The connection node between the seventh switch Q7 and the ninth switch Q9 is connected to the first terminal of the seventh switch unit 150, and the connection node between the eighth switch Q8 and the tenth switch Q10 is connected to the second terminal of the seventh switch unit 150.

Optionally, the seventh switch unit 150 includes an eleventh switch Q11 and a twelfth switch Q12. The connection node between the seventh switch Q7 and the ninth switch Q9 is connected to the drain of the eleventh switch Q11. The connection node between the eighth switch Q8 and the tenth switch Q10 is connected to the drain of the twelfth switch Q12. The source of the eleventh switch Q11 and the source of the twelfth switch Q12 are connected.

The circuit structure shown in FIG. 11 can also achieve a 1:1 pass-through function. At this time, the control unit 90 controls the first switch Q1, the fourth switch Q4, the eighth switch Q8, and the ninth switch Q9 to always be in the on state, and controls the twelfth switch Q12 and the thirteenth switch Q13 to always be in the off state. Then, the third switch Q3, the sixth switch Q6, the seventh switch Q7, and the tenth switch Q10 constitute a full-wave rectification circuit. The filter capacitor C8 is the output filter capacitor C8 of the full-wave rectification. Of course, if the control unit 90 controls the eleventh switch Q11 and the twelfth switch Q12 to be always in the on state, then what is achieved at this time is still that the voltage across the filter capacitor C8 is close to twice of the voltage across the coil 100.

Figure 12:
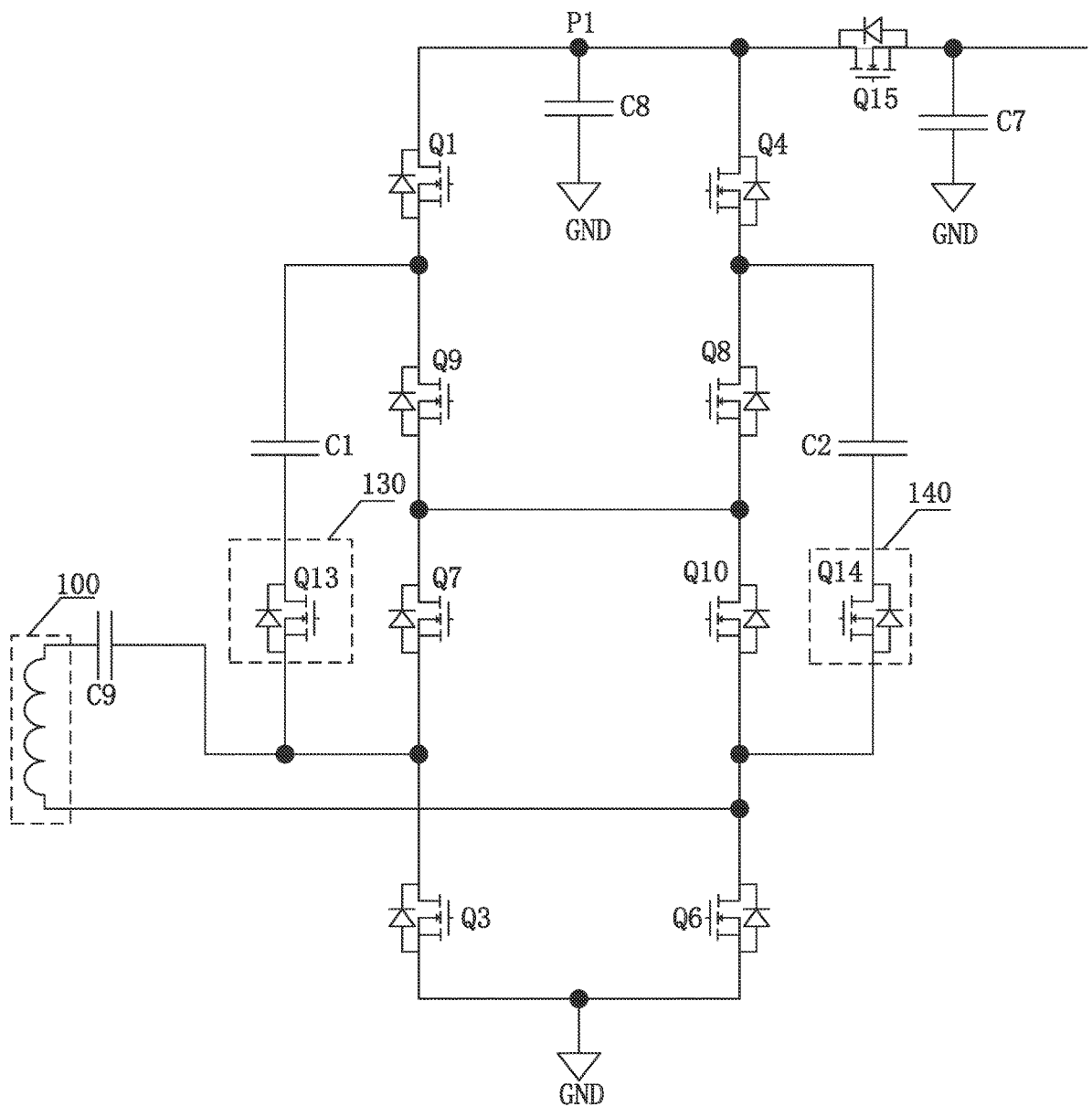
FIG. 12 is a schematic diagram of another circuit structure of a wireless charging receiving circuit provided by an embodiment of the present invention to realize a 1:1 pass-through mode.

It can be understood that, in other embodiments, by arranging switches in the first energy storage unit 70 and the second energy storage unit 80, a 1:1 pass-through function can also be realized, as shown in FIG. 12, the specific implementation is similar with that of the circuit structure of FIG. 4, and hence will not be repeated here.

At the same time, it should be noted that in other embodiments, the seventh switch unit 150 can also be implemented in other ways. For example, the seventh switch unit 150 is configured as a single-pole single-throw switch, or the seventh switch unit 150 still includes two switches, and the drain terminals of the two switches are connected, that is, only the two switches connected on the top.

Similarly, based on FIG. 10, two type-III expansion units can be added. The two type-III expansion units are used to convert the ratio of the effective value of the amplitude of the AC voltage signal across the coil 100 to the voltage on the first connection node P1 into 1:3.

Figure 13:
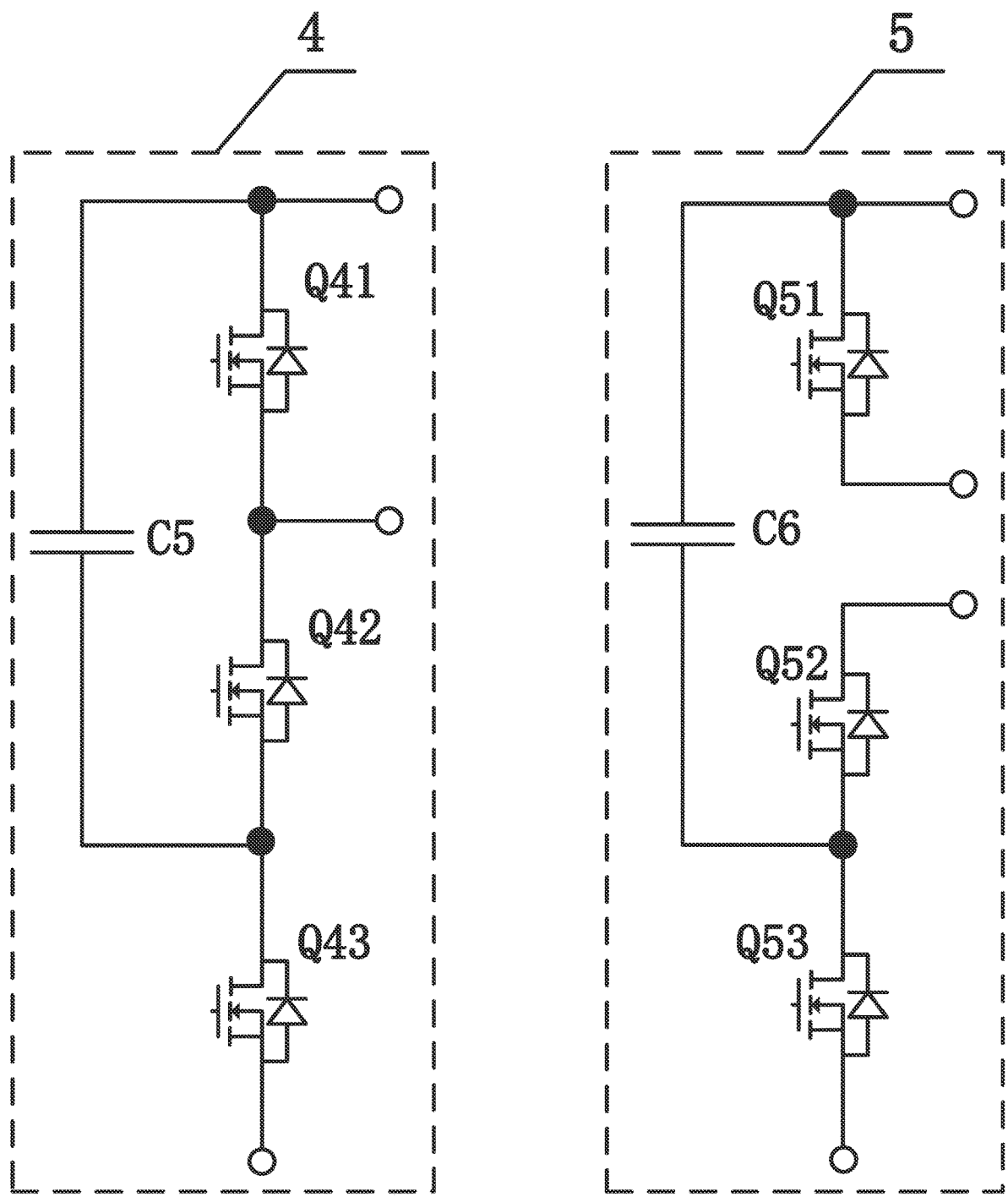
FIG. 13 is a schematic diagram of a circuit structure of a type-III expansion unit and type-IV expansion unit provided by an embodiment of the present invention.

In an embodiment, as shown in FIG. 13, the type-III expansion unit may be the type-III expansion unit 4. The type-III expansion unit 4 includes a fifth capacitor C5, a seventh expansion switch Q41, an eighth expansion switch Q42, and a ninth expansion switch Q43. The first terminal of the fifth capacitor C5 is connected to the drain of the seventh expansion switch Q41. The second terminal of the fifth capacitor C5 is connected to the source of the eighth expansion switch Q42 and the drain of the ninth expansion switch Q43, and the source of the seventh expansion switch Q42 is connected to the drain of the eighth expansion switch.

Figure 14:
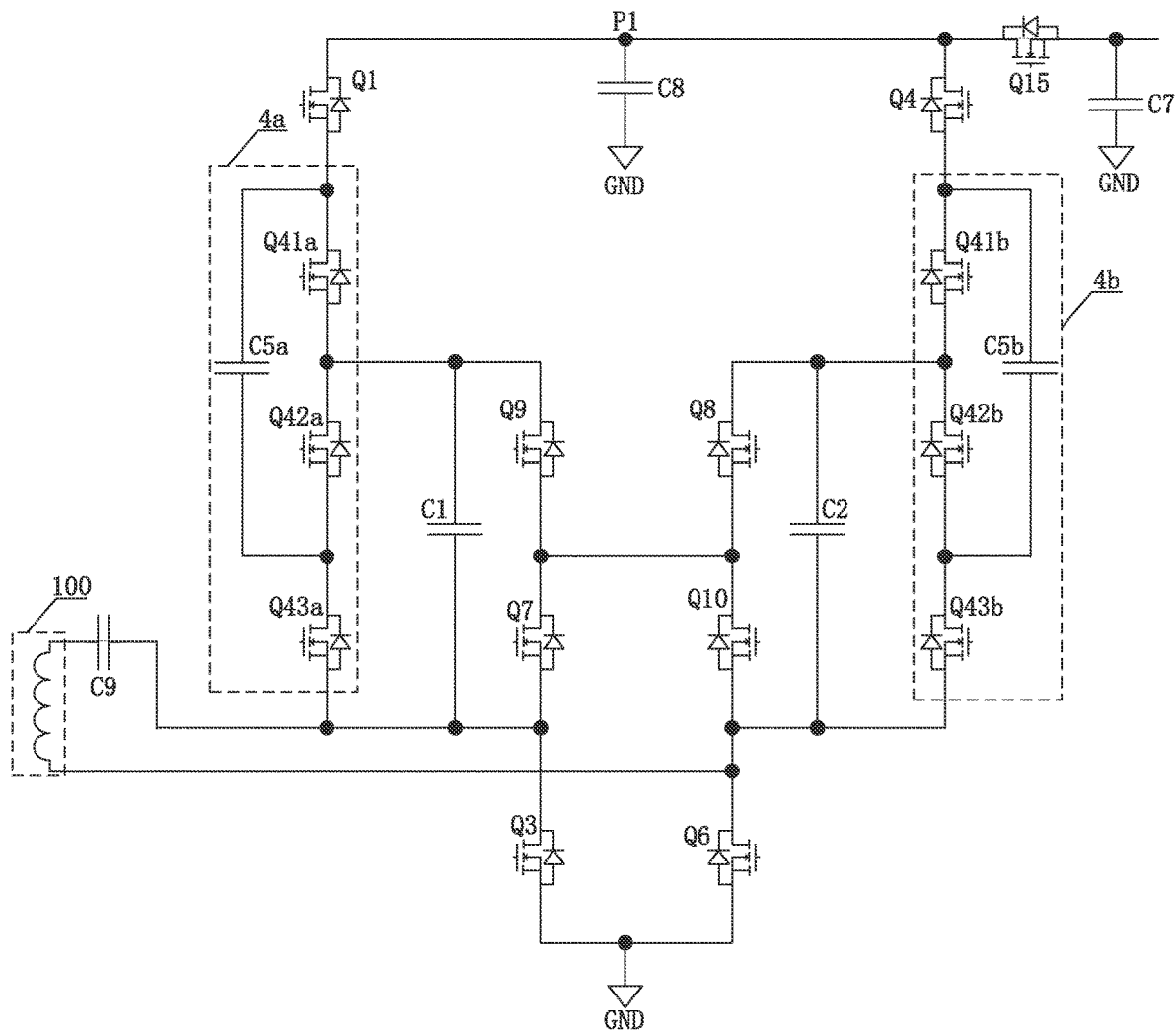
FIG. 14 is a schematic diagram of a circuit structure of a wireless charging receiving circuit provided by an embodiment of the present invention to implement a 1:3 voltage boost mode.

Optionally, as shown in FIG. 14, two type-III expansion units 4 are added to the circuit structure shown in FIG. 10. The two type-III expansion units 4 are the type-III expansion unit 4a and the type-III expansion unit 4b.

Specifically, the drain of the seventh expansion switch Q41a of the type-III expansion unit 4a is connected to the source of the first switch Q1. The source of the seventh expansion switch Q41a of the type-III expansion unit 4a is connected to the second terminal of the first capacitor C1. The source of the ninth expansion switch Q43a of the type-III expansion unit 4a is connected to the first terminal of the coil 100. The drain of the seventh expansion switch Q41b of the type-III expansion unit 4b is connected to the source of the fourth switch Q4. The source of the seventh expansion switch Q41b of the type-III expansion unit 4b is connected to the first terminal of the second capacitor C2, and the source of the ninth expansion switch Q43b of the type-III expansion unit 4b is connected to the second terminal of the coil 100.

In practical applications, when the alternating current signal on the coil 100 is in the positive half cycle, the control unit 90 controls the first switch Q1, the sixth switch Q6, the seventh switch Q7, the eighth switch Q8, and the eighth expansion switch Q42a of the type-III expansion unit 4a, and the seventh expansion switch Q41b and the ninth expansion switch Q43b of the type-III expansion unit 4b to be turned on, and control the other switches to be turned off. At this time, a portion of the alternating current signal on the coil 100 discharges the first capacitor and the fifth capacitor C5a of the type-III expansion unit 4a connected in series to charge the filter capacitor Q8 through the first switch Q1, the sixth switch Q6, the eighth expansion switch Q42a of the type-III expansion unit 4a. The other portion of the alternating current signal on the coil 100 charges the second capacitor C2 and the fifth capacitor C5b of the type-III expansion unit 4b connected in parallel through the sixth switch Q6, the seventh switch Q7, the eighth switch Q8, the seventh expansion switch Q41b and the ninth expansion switch Q43b of the type-III expansion unit 4b. In addition, the first switch Q1, the sixth switch Q6, the seventh switch Q7, the eighth switch Q8, and the eighth expansion switch Q42a of the type-III expansion unit 4a, and the seventh expansion switch Q41b and the ninth expansion switch Q43b of the type-III expansion unit 4b are turned off when the alternating current signal of the coil 100 reaches zero, to reduce switching losses.

When the alternating current signal on the coil 100 is in the negative half cycle, the control unit 90 controls the third switch Q3, the fourth switch Q4, the ninth switch Q9, the tenth switch Q10, and the seventh expansion switch Q41a and the ninth expansion switch Q43a of the type-III expansion unit 4a, and the eighth expansion switch Q42b of the type-III expansion unit 4b to be turned on, and control the other switches to be turned off. At this time, a portion of the alternating current signal on the coil 100 charges the first capacitor C1 and the fifth capacitor C5a of the type-III expansion unit 4a connected in parallel through the ninth switch Q9, the tenth switch Q10, the seventh expansion switch Q41a and the ninth expansion switch Q43a of the type-III expansion unit 4a. The other portion of the alternating current signal on the coil 100 discharges the second capacitor C2 and the fifth capacitor C5b of the type-III expansion unit 4b connected in series through the third switch Q3, the fourth switch Q4, and the eighth expansion switch Q42b of the type-III expansion unit 4b to charge the filter capacitor C8.

In this way, the above two processes are repeatedly executed. When the third switch Q3, the ninth switch Q9, the seventh expansion switch Q41a and the ninth expansion switch Q43a of the type-III expansion unit 4a are turned on, the first capacitor C1 and the fifth capacitor C5a of the type-III expansion unit 4a are connected in parallel. When the sixth switch Q6, the eighth switch Q8, the seventh expansion switch Q41b and the ninth expansion switch Q43b of the type-III expansion unit 4b are turned on, the second capacitor C2 and the fifth capacitor C5b of the type-III expansion unit 4b are connected in parallel. When the first switch Q1, the sixth switch Q6, the seventh switch Q7, the eighth switch Q8, and the eighth expansion switch Q42a of the type-III expansion unit 4a are turned on, the first capacitor C1 and the second capacitor C2 are connected in series with the fifth capacitor C5a of the type-III expansion unit 4a and the second capacitor C2 is connected to the ground, so the voltage across the filter capacitor C8 is three times of the effective value of the voltage across the coil 100. Similarly, when the third switch Q3, the fourth switch Q4, the ninth switch Q9, the tenth switch Q10, and the eighth expansion switch Q42b of the type-III expansion unit 4b are turned on, the first capacitor C1 and the second capacitor C2 are connected in series with the fifth capacitor C5b of the type-III expansion unit 4b and the first capacitor C1 is connected to the ground, so the voltage across the filter capacitor C8 is three times of the effective value of the voltage across the coil 100. At the same time, in this operating state, the switching frequency of the charge pump is synchronized with the operating frequency of the wireless charging transmitter.

Similarly, based on FIG. 10, two type-IV expansion units can be added. The two type-IV expansion units are used to convert the ratio of the effective value of the amplitude of the AC voltage signal across the coil 100 to the voltage on the first connection node P1 into 1:3.

In another implementation, please refer to FIG. 13 again. The type-IV expansion unit may also be the type-IV expansion unit 5. The type-IV expansion unit 5 includes a sixth capacitor C6, a tenth expansion switch Q51, an eleventh expansion switch Q52, and a twelfth expansion switch Q53. The first terminal of the sixth capacitor C6 is connected to the drain of the tenth expansion switch Q51, and the second terminal of the sixth capacitor C6 is connected to the source of the eleventh expansion switch Q52 and the drain of the twelfth expansion switch Q53.

Figure 15:
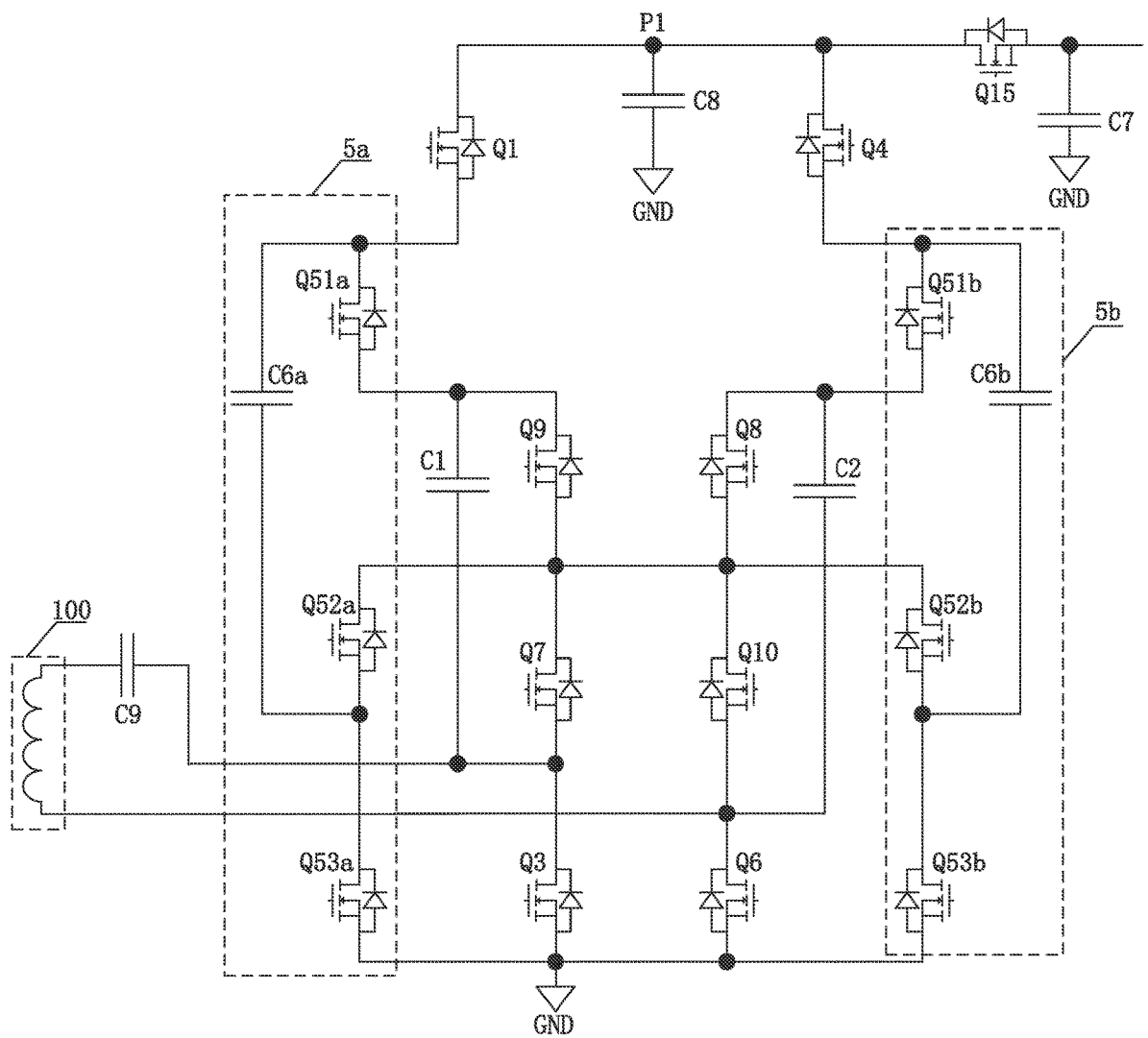
FIG. 15 is a schematic diagram of another circuit structure of the wireless charging receiving circuit provided by an embodiment of the present invention to implement a 1:3 voltage boost mode.

Then two type-IV expansion units 5 are added to the circuit structure shown in FIG. 10. As shown in FIG. 15, two type-IV expansion units 5 can be obtained. The two type-IV expansion units 5 are the type-IV expansion unit 5a and the type-IV expansion unit 5b.

Specifically, the drain of the tenth expansion switch Q51a of the type-IV expansion unit 5a is connected to the source of the first switch Q1. The source of the tenth expansion switch Q51a of the type-IV expansion unit 5a is connected to the second terminal of the first capacitor C1. The drain of the eleventh expansion switch Q52a of the type-IV expansion unit 5a is connected to the connection node between the drain of the seventh switch Q7 and the source of the ninth switch Q9. The source of the twelfth expansion switch Q53a of the type-IV expansion unit 5a is grounded. The drain of the tenth expansion switch Q51b of the type-IV expansion unit 5b is connected to the source of the fourth switch Q4. The source of the tenth expansion switch Q51b of the type-IV expansion unit 5b is connected to the first terminal of the second capacitor C2. The drain of the eleventh expansion switch Q52b of the type-IV expansion unit 5b is connected to the connection node between the source of the eighth switch Q8 and the drain of the tenth switch Q10. The of the twelfth expansion switch Q53b of the type-IV expansion unit 5b is grounded.

In practical applications, when the alternating current signal on the coil 100 is in the positive half cycle, the control unit 90 controls the fourth switch Q4, the sixth switch Q6, the seventh switch Q7, the eighth switch Q8, and the tenth expansion switch Q51a and the twelfth expansion switch Q53a of the type-IV expansion unit 5a and the eleventh expansion switch Q52b of the type-IV expansion unit 5b to be turned on, and controls the other switches to be turned off. At this time, a portion of the alternating current signal on the coil 100 discharges the first capacitor C1 through the sixth switch Q6, the tenth expansion switch Q51a and the twelfth expansion switch Q53a of the type-IV expansion unit 5a to charge the sixth capacitor C6a of the type-IV expansion unit 5a. The other portion of the alternating current signal on the coil 100 charges the second capacitor C2 through the fourth switch Q4, the seventh switch Q7, the eighth switch Q8, and the eleventh expansion switch Q52b of the type-IV expansion unit 5b. By discharging the sixth capacitor C6b of the type-IV expansion unit 5b, the purpose of charging the filter capacitor C8 is achieved. Since the sixth capacitor C6b of the type-IV expansion unit 5b has been the same as the sixth capacitor C6a of the type-IV expansion unit 5a in the previous cycle, the voltage accumulated on the sixth capacitor C6b of the type-IV expansion unit 5b is twice of the effective value of the voltage across the coil 100. After being connected in series with the second capacitor C2, the voltage obtained is three times of the effective value of the voltage across the coil 100, that is, the voltage across the filter capacitor C8 is three times of the effective value of the voltage across the coil 100. In addition, the fourth switch Q4, the sixth switch Q6, the seventh switch Q7, the eighth switch Q8, and the tenth expansion switch Q51a and the twelfth expansion switch Q53a of the type-IV expansion unit 5a, and the eleventh expansion switch Q52b of the type-IV expansion unit 5b are controlled to be turned off when the alternating current signal of the coil 100 reaches zero, to reduce switching losses.

When the alternating current signal on the coil 100 is in the negative half cycle, the control unit 90 controls the first switch Q1, the third switch Q3, the ninth switch Q9, the tenth switch Q10, and the eleventh expansion switch Q52a of the type-IV expansion unit 5a, the tenth expansion switch Q51b and the twelfth expansion switch Q53b of the type-IV expansion unit 5b to be turned on, and controls the other switches to be turned off. At this time, a portion of the alternating current signal on the coil 100 charges the first capacitor C1 through the first switch Q1, the ninth switch Q9, the tenth switch Q10, and the eleventh expansion switch Q52a of the type-IV expansion unit 5a, and discharges the sixth capacitor C6a of the type-IV expansion unit 5a to charge the filter capacitor C8. The other portion of the alternating current signal on the coil 100 discharges the second capacitor C2 through the third switch Q3, the tenth expansion switch Q51b and the twelfth expansion switch Q53b of the type-IV expansion unit 5b to charge the sixth capacitor C6b of the type-IV expansion unit 5b Similarly, it can also be achieved that the voltage across the filter capacitor C8 is three times of the effective value of the voltage across the coil 100. In addition, the first switch Q1, the third switch Q3, the ninth switch Q9, the tenth switch Q10, and the eleventh expansion switch Q52a of the third expansion and the tenth expansion switch Q51b and the twelfth expansion switch Q53b of the type-IV expansion unit 5b are controlled to be turned off when the alternating current signal of the coil 100 reaches zero, to reduce switching losses.

By repeating the above two processes in this way, the ratio of the effective value of the amplitude of the AC voltage signal on the coil 100 to the voltage at the first connection node P1 can be converted to 1:3.

Figure 15A:
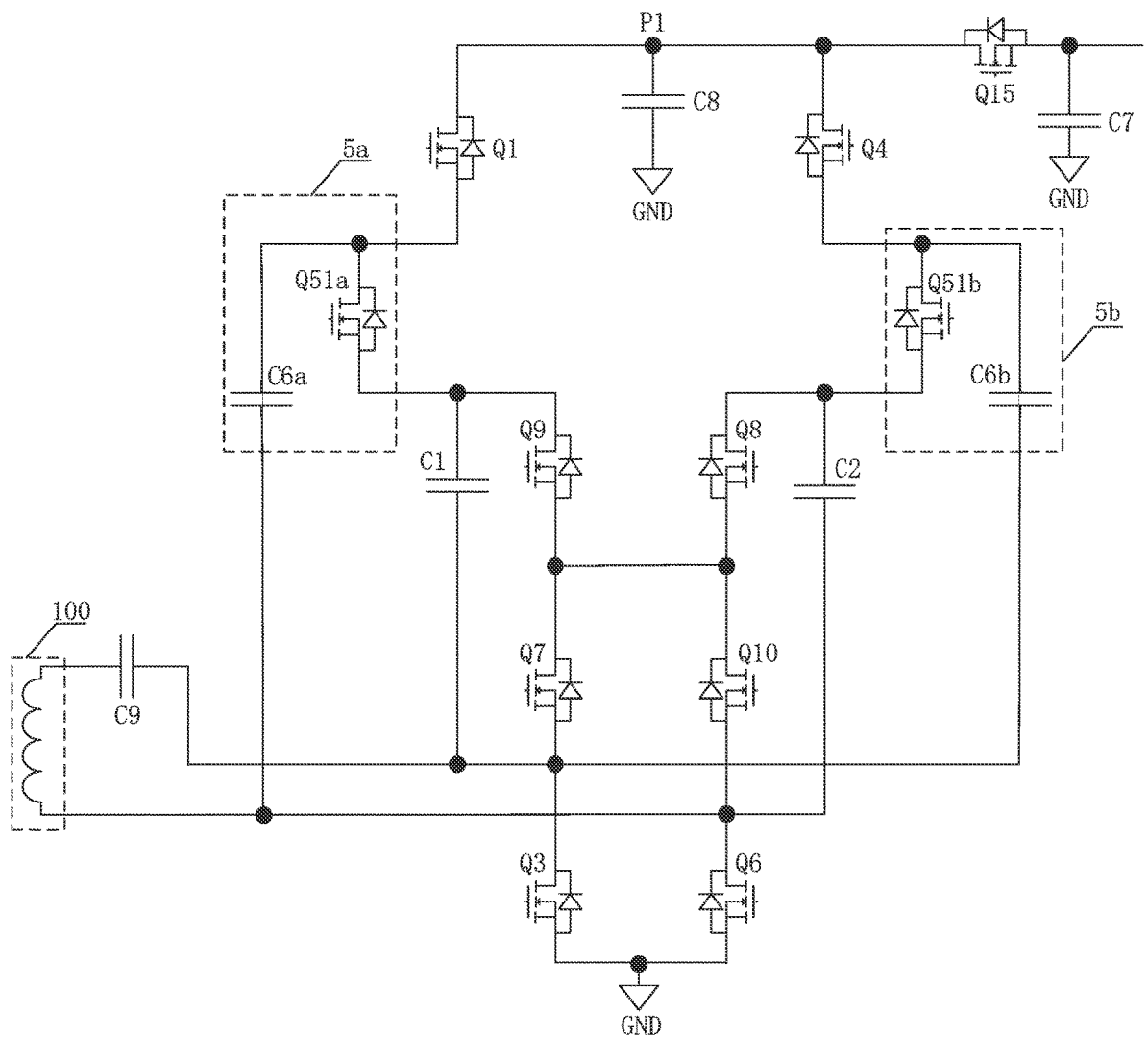

It should be noted that the circuit structure in FIG. 14 or FIG. 15 is used to convert the ratio of the effective value of the AC voltage signal amplitude on the coil 100 to the voltage at the first connection node P1 to 1:3 by adding two type-III expansion units 4 or two type-IV expansion units 5. According to the simplification discussed above with respect to the circuit shown in FIG. 7 to achieve the circuit in FIG. 7B, the circuit shown if FIG. 15 can also be simplified to obtain the circuit in FIG. 15A, to improve the power conversion efficiency and reduce the circuit area.

Figure 16:
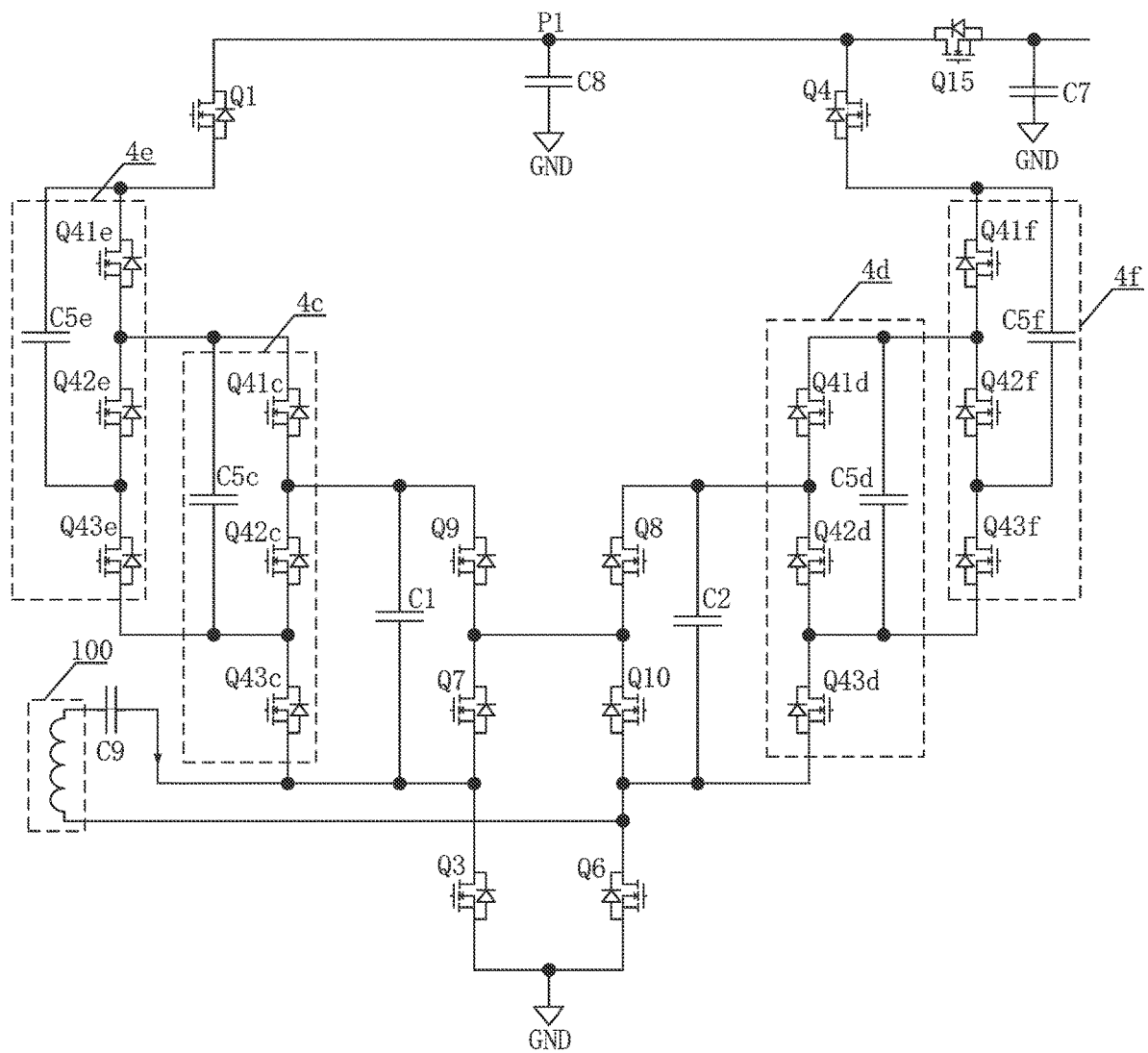
FIG. 16 is a schematic diagram of a circuit structure of a wireless charging receiving circuit provided by an embodiment of the present invention to implement a 1:4 voltage boost mode.

In other embodiments, as described in the above-mentioned manner, the ratio of the effective value of the amplitude of the AC voltage signal on the coil 100 to the voltage on the first connection node P1 can be converted to 1:K where K is a positive integer greater than 3. For example, by adding two type-III expansion units 4 based on FIG. 14, the wireless charging receiving circuit includes a total of four type-III expansion units 4 as shown in FIG. 16. The four type-III expansion units are the expansion unit 4c and the expansion unit 4d, the expansion unit 4e, and expansion unit 4f. At this time, the ratio of the effective value of the amplitude of the AC voltage signal across the coil 100 to the voltage on the first connection node P1 is 1:4. The specific implementation process is the same as the above implementation and will not be repeated it here. For another example, in another embodiment, two type-III expansion units 4 and two type-IV expansion units 5 can also be added at the same time, so the ratio of the effective value of the amplitude of the AC voltage signal across the coil 100 to the voltage at the point P1 is converted to 1:5, and the specific implementation process is similar to the foregoing embodiment, and will not be repeated here.

The present application also provides a wireless charging receiver, which includes the wireless charging receiving circuit as in any of the above embodiments.

Finally, it should be noted that the above embodiments are only used to illustrate the technical solutions of the present invention, not to limit them; under the idea of the present invention, the technical features of the above embodiments or different embodiments can also be combined. The steps can be implemented in any order, and there are many other variations of the different aspects of the present invention as described above. For the sake of brevity, they are not provided in the details; although the present invention has been described in detail with reference to the foregoing embodiments, it is common that the technical personnel should understand that: they can still modify the technical solutions recorded in the foregoing embodiments, or equivalently replace some of the technical features; and these modifications or substitutions do not make the essence of the corresponding technical solutions deviate from the implementations of this application examples of the scope of technical solutions.

What is claimed is:

1. A wireless charging receiving circuit comprising:
a coil, a first capacitor, a second capacitor, a first switch, a second switch, a third switch, a fourth switch, a fifth switch, a sixth switch, a filter unit and a control unit, wherein:
a first terminal of the first capacitor is directly connected to a source of the second switch and a drain of the third switch, and connected to a first terminal of the coil;
a second terminal of the first capacitor is connected to a source of the first switch and directly connected to a drain of the fifth switch;
a drain of the first switch is connected to a first terminal of the filter unit and a drain of the fourth switch at a first connection node;
a drain of the second switch is directly connected to a first terminal of the second capacitor, and connected to a source of the fourth switch;
a second terminal of the second capacitor is directly connected to a source of the fifth switch and a drain of the sixth switch, and connected to a second terminal of the coil;
a source of the sixth switch unit, a second terminal of the filter unit and a source of the third switch unit are all grounded; and
the control unit is connected to a gate of each switch, and the control unit is used to control a conduction state of each switch so that a voltage at the first connection node is an integer multiple of an effective value of an amplitude of an AC voltage signal across the coil.

2. The wireless charging receiving circuit according to claim 1, wherein:
if a voltage across the coil is an input voltage, and the voltage on the first connection node is an output voltage, the control unit is specifically used for the following:
when an alternating current signal on the coil is in a positive half cycle, the control unit controls the first switch, the second switch, and the sixth switch to be turned on, and at the same time controls the remaining switches to be turned off; and
when the alternating current signal on the coil is in a negative half cycle, the control unit controls the third switch, the fourth switch and the fifth switch to be turned on, and controls the remaining switches to be turned off at the same time.

3. The wireless charging receiving circuit according to claim 1, wherein:
if the voltage on the first connection node is an input voltage, and a voltage across the coil is an output voltage, the control unit is specifically used for the following:
a combination of the first switch, the second switch and the sixth switch, and a combination of the third switch, the fourth switch, and the fifth switch are alternately turned on at a preset frequency.

4. The wireless charging receiving circuit according to claim 1, wherein:

the wireless charging receiving circuit further includes two type-I expansion units, and the two type-I expansion units are used to convert a ratio of the effective value of the amplitude of the AC voltage signal across the coil to the voltage at the first connection node to 1:3.

5. The wireless charging receiving circuit according to claim 4, wherein:
the type-I expansion unit includes a third capacitor, a first expansion switch, a second expansion switch, and a third expansion switch, and wherein:
a first terminal of the third capacitor is connected to a drain of the first expansion switch;
a second terminal of the third capacitor is connected to a source of the second expansion switch and a drain of the third expansion switch;
a source of the first expansion switch is connected to a drain of the second expansion switch; and
gate terminals of the first expansion switch, the second expansion switch and the third expansion switch are all connected with the control unit.

6. The wireless charging receiving circuit according to claim 5, wherein:
the drain of the first expansion switch of a first type-I expansion unit is connected to the source of the first switch;
the source of the first expansion switch of the first type-I expansion unit is connected to the second terminal of the first capacitor;
a source of the third expansion switch of the first type-I expansion unit is connected to the first terminal of the coil;
the drain of the first expansion switch of a second type-I expansion unit is connected to the source of the fourth switch;
the source of the first expansion switch of the second type-I expansion unit is connected to the first terminal of the second capacitor; and
the source of the third expansion switch of the second type-I expansion unit is connected to the second terminal of the coil, and wherein the control unit is specifically used for the following:
when an alternating current signal on the coil is in a positive half cycle, the control unit controls the first switch, the second switch, the sixth switch, and the second expansion switch of the first type-I expansion unit, the first expansion switch and the third expansion switch of the second type-I expansion unit to be turned on, while controlling the other switches to be turned off; and
when the alternating current signal on the coil is in a negative half cycle, the control unit controls the third switch, the fourth switch, the fifth switch, the first expansion switch and the third expansion switch of the first type-I expansion unit, and the second expansion switch of the second type-I expansion unit to be turned on, and controls the other switches to be turned off at the same time.

7. The wireless charging receiving circuit according to claim 5, wherein:
the drain of the first expansion switch of a first type-I expansion unit is connected to the source of the first switch;
the source of the first expansion switch of the first type-I expansion unit is connected to the second terminal of the first capacitor;
the source of the third expansion switch of the first type-I expansion unit is grounded;

the drain of the first expansion switch of a second type-I expansion unit is connected to the source of the fourth switch;

the source of the first expansion switch of the second type-I expansion unit is connected to the first terminal of the second capacitor; and the source of the third expansion switch of the second type-I expansion unit is grounded, and wherein the control unit is specifically used for the following:

when an alternating current signal on the coil is in a positive half cycle, the control unit controls the second switch, the fourth switch, the sixth switch, and the first expansion switch and the third expansion switch of the first type-I expansion unit and the second expansion switch of the second type-I expansion unit to be turned on, while controlling the remaining switches to be turned off; and when the alternating current signal on the coil is in a negative half cycle, the control unit controls the first switch, the third switch, the fifth switch, and the second expansion switch of the first type-I expansion unit and the first expansion switch and the third expansion switch of the second type-I expansion unit to be turned on, and controls the remaining switches to be turned off at the same time.

8. The wireless charging receiving circuit according to claim 5, wherein:

the drain of the first expansion switch of a first type-I expansion unit is connected to the source of the first switch;

the source of the first expansion switch of the first type-I expansion unit is connected to the second terminal of the first capacitor;

a source of the third expansion switch of the first type-I expansion unit is connected to the first terminal of the coil;

the drain of the first expansion switch of a second type-I expansion unit is connected to the source of the fourth switch;

the source of the first expansion switch of the second type-I expansion unit is connected to the first terminal of the second capacitor; and the source of the third expansion switch of the second type-I expansion unit is connected to the second terminal of the coil, and wherein the control unit is specifically used for the following:

when an alternating current signal on the coil is in a positive half cycle, the control unit controls the first switch, the second switch, the sixth switch, and the second expansion switch of the first type-I expansion unit, the first expansion switch and the third expansion switch of the second type-I expansion unit to be turned on, while controlling the other switches to be turned off; and when the alternating current signal on the coil is in a negative half cycle, the control unit controls the third switch, the fourth switch, the fifth switch, the first expansion switch and the third expansion switch of the first type-I expansion unit, and the second expansion switch of the second type-I expansion unit to be turned on, and controls the other switches to be turned off at the same time, and wherein:

the wireless charging receiving circuit further includes third and fourth type-I expansion units, and wherein the third and fourth type-I expansion units are used to convert the ratio of the effective value of the amplitude of the AC voltage signal across the coil to the voltage on the first connection node to 1:4.

9. The wireless charging receiving circuit according to claim 8, wherein:

the drain of the first expansion switch of the third type-I expansion unit is connected to the source of the first switch;

the source of the first expansion switch of the third type-I expansion unit is connected to the first terminal of the third capacitor of the first type-I expansion unit;

the source of the third expansion switch of the third type-I expansion unit is connected to the second terminal of the third capacitor of the first type-I expansion unit;

the drain of the first expansion switch of the fourth type-I expansion unit is connected to the source of the fourth switch;

the source of the first expansion switch of the fourth type-I expansion unit is connected to the first terminal of the third capacitor of the second type-I expansion unit; and the source of the third expansion switch of the fourth type-I expansion unit is connected to the second terminal of the third capacitor of the second type-I expansion unit, and wherein the control unit is specifically used for the following:

when the alternating current signal on the coil is in a positive half cycle, the control unit controls the first switch, the second switch, the sixth switch, and the second expansion switch of the first type-I expansion unit, the first expansion switch and the third expansion switch of the second type-I expansion unit, the second expansion switch of the third type-I expansion unit, and the first expansion switch and the third expansion switch of the fourth type-I expansion unit to be turned on, and controls the other switches to be turned off at the same time; and when the alternating current signal on the coil is in a negative half cycle, the control unit controls the third switch, the fourth switch, the fifth switch, and the first expansion switch and the third expansion switch of the first type-I expansion unit, the second expansion switch of the second type-I expansion unit, the first expansion switch and the third expansion switch of the third type-I expansion unit, and the second expansion switch of the fourth type-I expansion unit to be turned on, and controls the other switches are controlled to be turned off at the same time.

10. A power converter comprising:

a inductive unit, a first capacitor, a second capacitor, a first switch, a second switch, a third switch, a fourth switch, a fifth switch, a sixth switch, a filter unit and a control unit, wherein:

a first terminal of the inductive unit is connected to a first terminal of the first capacitor, a first terminal of the second switch, and a first terminal of the third switch;

a second terminal of the first capacitor is connected to a first terminal of the first switch and a first terminal of the fifth switch;

a second terminal of the first switch is connected to a first terminal of the filter unit and a first terminal of the fourth switch;

a second terminal of the fourth switch is connected to a second terminal of the second switch and a first terminal of the second capacitor;

a second terminal of the second capacitor is connected to a second terminal of the fifth switch, a first terminal of the sixth switch, and a second terminal of the inductive unit;

a second terminal of the sixth switch, a second terminal of the filter unit and a second terminal of the third switch are all grounded, and wherein:

a drain of the fifth switch is directly connected to the first switch, and a source of the fifth switch is directly connected to the sixth switch;

a drain of the second switch is directly connected to the fourth switch, and a source of the second switch is directly connected to the third switch;

a connection node between the second terminal of the first switch, the first terminal of the filter unit and the first terminal of the fourth switch is a first connection node; and the control unit is connected to each switch, and the control unit is used to control a conduction state of each switch so that a voltage at the first connection node is higher than an effective value of an amplitude of an AC voltage signal across the inductive unit.

\* \* \* \* \*